US011632737B2

(12) United States Patent
Prakash et al.

(10) Patent No.: US 11,632,737 B2
(45) Date of Patent: Apr. 18, 2023

(54) TIME SENSITIVE NETWORKING FOR POSITIONING

(71) Applicant: QUALCOMM Incorporated, San Diego, CA (US)

(72) Inventors: Rajat Prakash, San Diego, CA (US); Lorenzo Ferrari, Oakland, CA (US); Srinivas Yerramalli, Hyderabad (IN); Xiaoxia Zhang, San Diego, CA (US); Alexandros Manolakos, Escondido, CA (US); Sven Fischer, Nuremberg (DE); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/221,619

(22) Filed: Apr. 2, 2021

(65) Prior Publication Data

US 2021/0329584 A1    Oct. 21, 2021

Related U.S. Application Data

(60) Provisional application No. 63/011,863, filed on Apr. 17, 2020.

(51) Int. Cl.
*H04W 24/10* (2009.01)
*H04W 64/00* (2009.01)
(Continued)

(52) U.S. Cl.
CPC ......... *H04W 64/003* (2013.01); *H04B 17/27* (2015.01); *H04L 5/0051* (2013.01);
(Continued)

(58) Field of Classification Search
CPC ............... H04W 16/28; H04W 56/001; H04W 56/0055; H04W 64/00; H04W 64/003;
(Continued)

(56) References Cited

U.S. PATENT DOCUMENTS 10,117,214 B1 * 10/2018 Peden .................... H04L 67/306
10,871,545 B2 * 12/2020 Modarres Razavi ........................
                                                    G01S 5/0231
(Continued)

OTHER PUBLICATIONS

International Search Report and Written Opinion—PCT/US2021/025777—ISA/EPE—dated Jul. 6, 2021.
(Continued)

*Primary Examiner* — Jean A Gelin
(74) *Attorney, Agent, or Firm* — Thien T. Nguyen

(57) ABSTRACT

A wireless network including user equipment (UE) and base stations is configured to perform position determination with low latency and high availability within the Time-Sensitive Networking (TSN) framework. For example, the UE may be integrated as a sensor in a motion control system or similar applications. The UE and base stations are synchronized with the TSN clock, and are configured to perform positioning measurements at a specific time point within the TSN framework. The time point, for example, may be a global sampling point, at which all sensor nodes in the TSN framework perform position measurements. A location server may be provided with the positioning measurements or a position estimate from the UE and provide the position estimate to an external client, such as a motion controller in a motion control system.

53 Claims, 17 Drawing Sheets

(51) Int. Cl.
  *H04W 4/02* (2018.01)
  *H04W 72/1268* (2023.01)
  *H04L 5/00* (2006.01)
  *H04B 17/27* (2015.01)
(52) U.S. Cl.
  CPC ........... *H04W 4/025* (2013.01); *H04W 24/10* (2013.01); *H04W 72/1268* (2013.01)
(58) Field of Classification Search
  CPC ........... H04W 64/006; H04W 72/1265; H04W 4/025; H04W 24/08; H04W 24/10; H04L 1/0067; H04L 5/0048; H04L 5/0051; H04B 17/27
  See application file for complete search history.

(56) References Cited

U.S. PATENT DOCUMENTS

| | | | | |
|---|---|---|---|---|
| 11,368,816 | B2 | 6/2022 | Yerramalli et al. | |
| 2013/0188510 | A1* | 7/2013 | Siomina | H04W 24/10 370/252 |
| 2014/0162684 | A1* | 6/2014 | Shaw | H04W 4/029 455/456.1 |
| 2016/0269923 | A1* | 9/2016 | Celik | H04W 4/06 |
| 2021/0219357 | A1* | 7/2021 | Talebi Fard | H04L 47/801 |
| 2021/0410097 | A1* | 12/2021 | Munier | H04W 64/00 |
| 2022/0046731 | A1* | 2/2022 | Talebi Fard | H04L 67/14 |
| 2022/0053443 | A1* | 2/2022 | Kim | H04W 64/00 |
| 2022/0095265 | A1* | 3/2022 | Cha | H04L 5/0051 |
| 2022/0110085 | A1* | 4/2022 | Khoryaev | H04L 5/0051 |

OTHER PUBLICATIONS

NGMN Alliance: "5G E2E Technology to Support Verticals URLLC Requirements", 3GPP Draft, RP-200025.ZIP 191031 NGMN_Verticals_URLLC_Requirements_V15_Final, 3rd Generation Partnership Project (3GPP), Mobile Competence Centre, 650, Route Des Lucioles, F-06921 Sophia-Antipolis C, Feb. 22, 2020 (Feb. 22, 2020), XP051854781, pp. 1-50, Retrieved from the Internet: URL:https://ftp.3gpp.org/tsg_ran/TSG_RAN/TSGR_87e/Docs/RP-200025.zip 191031 NGMN_Verticals_URLLC_Requirements_v15_Final.zip 191031 NGMN Verticals URLLC Requirements v15 Final .docx [retrieved on Feb. 22, 2020] Paragraphs [06.3]-[6.3.3], [06.4] [6.4.1].

Qualcomm Incorporated: "DL and UL NR Positioning Procedures", 3GPP Draft, 3GPP TSG-RNA WG2 Meeting #107bis, R2-1913395 (Positioning Procedures + Draft LPP CR), 3rd Generation Partnership Project (3GPP), Mobile Competence Centre, 650, Route Des Lucioles, F-06921 Sophia-Antipolis Cedex, France, vol. Ran WG2, No. Chongqing, China, Oct. 14, 2019-Oct 18, 2019, Oct. 4, 2019 (Oct. 4, 2019), pp. 1-53, XP051804974, Retrieved from the Internet: URL: https://ftp.3gpp.org/tsg_ran/WG2_RL2/TSGR2_107bis/Docs/R2-1913395.zip. R2-1913395_(Positioning Procedures + Draft LPP CR).docx [retrieved on Oct. 4, 2019] Par. 3 p. 5. lines 4-5 p. 6. line 11-p. 7. line 2 p. 7. lines 8-20 figure 4, p. 16, paragraph 3.2.

Qualcomm Incorporated: "Comparison of 5GC-LMF and RAN-LMC Based Positioning", 3GPP Draft, R3-195824_(Local LMF Benefits), 3GPP TSG RAN WG3 Meeting #105bis, 3rd Generation Partnership Project (3GPP), Mobile Competence Centre, 650, Route Des Lucioles, F-06921 Sophia-Antipolis Cedex, France vol. RAN WG3, No. Chongqing, China, Oct. 14, 2019-Oct. 18, 2019, Oct. 4, 2019 (Oct. 4, 2019), XP051810037, 14 Pages, Retrieved from the Internet: URL:https://ftp.3gpp.org/tsg_ran/WG3_lu/TSGR3_105bis/Docs/R3-195824.zip R3-195824_(Local LMF Benefits).docx [retrieved on Oct. 4, 2019] Section 2.3, figures 6, 7, p. 12, paragraph 3. 1, figure 6.

Qualcomm Incorporated: "On Demand Transmission of PRS for NR," 3GPP Draft, 3GPP TSG-RAN WG2 Meeting #104, R2-1817902_(On Demand PRS), 3rd Generation Partnership Project (3GPP), Mobile Competence Centre, 650, Route Des Lucioles, F-06921, Sophia-Antipolis Cedex, France, vol. RAN WG2. No, Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip [retrieved on Nov. 12, 2018], the whole document, Sections 9.2.X.3 and 9.2.x.6;figures9.2.x.3-1,9.2.x.6-1, 9.2.x.2.1,9.2.x.3.1.

Qualcomm Incorporated: "Stage 2 for Multi-RTT Positioning", 3GPP Draft, 3GPP TSG-RAN WG2 Meeting #108, R2-1915558, 3rd Generation Partnership Project (3GPP), Mobile Competence Centre, 650, Route Des Lucioles, F-06921, Sophia-Antipolis Cedex, France, vol. RAN WG2, No. Reno, Nevada, USA, Nov. 18, 2019-Nov. 22, 2019, Nov. 8, 2019 (Nov. 8, 2019), XP051817272, 19 Pages, Retrieved from the Internet: URL: https://ftp.3gpp.org/tsg_ran/WG2_RL2/TSGR2_108/Docs/R2-1915558.zip R2-1915558 (TP for mRTT Stage 2).docx [retrieved-on Nov. 8, 2019] pp. 1-11, p. 2, paragraph 2, p. 12, paragraph 3.1, paragraph [8. x.2. 2], figures 8.X.3.1.3.1-1.

* cited by examiner

TIME SENSITIVE NETWORKING FOR POSITIONING

CLAIM OF PRIORITY UNDER 35 U.S.C. § 119

This application claims under 35 U.S.C. § 119 the benefit of and priority to U.S. Provisional Application No. 63/011,863, filed Apr. 17, 2020, and entitled "TIME SENSITIVE NETWORKING FOR POSITIONING," which is assigned to the assignee hereof and is incorporated herein by reference in its entirety.

BACKGROUND

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Certain location use cases require very high accuracy and low latency in provision of a location of a mobile device to an external client. Examples include: smart (automated) factories and warehouses where the positions of tools, objects being fabricated and packages may need to be known with an accuracy of 10 centimeters (cms) or less and with a latency of less than 1 second; drones where a location accurate to 1 meter may need to be known within a second; public safety first responders at a dangerous location (e.g. inside a burning or partially collapsed building); and user cases associated with moving vehicles and pedestrians (known as V2X). Other user cases associated with very high location accuracy may also have very low latency requirements due to a rapid deterioration in location accuracy for a moving object. For example, even at only 4 mph (normal walking speed), an object would move 1.79 meters in 1 second, thereby nullifying the benefit of 1 meter location accuracy after less than 1 second. Desired accuracy and latency requirements for positioning information in use cases, such as industrial control loops, cannot be obtained with current wireless location solutions.

SUMMARY

A wireless network including user equipment (UE) and base stations is configured to perform position determination with low latency and high availability within the Time-Sensitive Networking (TSN) framework. For example, the UE may be integrated as a sensor in a motion control system or similar applications. The UE and base stations are synchronized with the TSN clock, and are configured to perform positioning measurements at a specific time point within the TSN framework. The time point, for example, may be a global sampling point, at which all sensor nodes in the TSN framework perform position measurements. A location server may be provided with the positioning measurements or a position estimate from the UE and provide the position estimate to an external client, such as a motion controller in a motion control system.

In one implementation, a method performed by an entity in a wireless network of positioning of a user equipment (UE) within the wireless network, includes receiving a location request message that includes a first time point within a time sensitive networking (TSN) framework for performing positioning measurements for the UE; receiving positioning reference signals (PRS) from one or more other entities in the wireless network; performing the positioning measurements using the PRS from the one or more other entities at the first time point within the TSN framework specified in the location request message for performing the positioning measurement; and transmitting to a location server a location information report related to the positioning measurements.

In one implementation, an entity in a wireless network configured to perform positioning of a user equipment (UE) within the wireless network, includes an external interface configured to wirelessly communicate with a network entity in the wireless network; at least one memory; at least one processor coupled to the external interface and the at least one memory, wherein the at least one processor is configured to: receive, via the external interface, a location request message that includes a first time point within a time sensitive networking (TSN) framework for performing positioning measurements for the UE; receive, via the external interface, positioning reference signals (PRS) from one or more other entities in the wireless network; perform the positioning measurements using the PRS from the one or more other entities at the first time point within the TSN framework specified in the location request message for performing the positioning measurements; and transmit, via the external interface, to a location server a location information report related to the positioning measurements.

In one implementation, an entity in a wireless network configured to perform positioning of a user equipment (UE) within the wireless network, includes means for receiving a location request message that includes a first time point within a time sensitive networking (TSN) framework for performing positioning measurements for the UE; means for receiving positioning reference signals (PRS) from one or more other entities in the wireless network; means for performing positioning measurements using the PRS from the one or more other entities at the first time point within the TSN framework specified in the location request message for performing the positioning measurements; and means for transmitting to a location server a location information report related to the positioning measurements.

In one implementation, a non-transitory computer readable storage medium including program code stored thereon, the program code is operable to configure at least one processor in an entity in a wireless network to perform positioning of a user equipment (UE) within the wireless network, includes program code including instructions to receive a location request message that includes a first time point within a time sensitive networking (TSN) framework for performing positioning measurements for the UE; program code to receive positioning reference signals (PRS) from one or more other entities in the wireless network; program code to perform the positioning measurements using the PRS from the one or more other entities at the first time point within the TSN framework specified in the location request message for performing the positioning measurements; and program code to transmit to a location server a location information report related to the positioning measurements.

In one implementation, a method performed by an entity in a wireless network of positioning of a user equipment (UE) within the wireless network, includes receiving a positioning reference signals (PRS) transmission request message that includes a first time point within a time sensitive networking (TSN) framework for transmitting PRS; and transmitting the PRS at the first time point within the TSN framework specified in the location request message for transmitting the PRS.

In one implementation, an entity in the wireless network configured to perform positioning of a user equipment (UE) within the wireless network, includes an external interface configured to wirelessly communicate with a network entity in the wireless network; at least one memory; at least one processor coupled to the external interface and the at least one memory, wherein the at least one processor is configured to: receive, via the external interface, a positioning reference signals (PRS) transmission request message that includes a first time point within a time sensitive networking (TSN) framework for transmitting PRS; and transmit, via the external interface, the PRS at the first time point within the TSN framework specified in the PRS transmission request message for transmitting the PRS.

In one implementation, an entity in the wireless network configured to perform positioning of a user equipment (UE) within the wireless network, includes means for receiving a positioning reference signals (PRS) transmission request message that includes a first time point within a time sensitive networking (TSN) framework for transmitting PRS; and means for transmitting the PRS at the first time point within the TSN framework specified in the PRS transmission request message for transmitting the PRS.

In one implementation, a non-transitory computer readable storage medium including program code stored thereon, the program code is operable to configure at least one processor in an entity in a wireless network to perform positioning of a user equipment (UE) within the wireless network, includes program code including instructions to receive a positioning reference signals (PRS) transmission request message that includes a first time point within a time sensitive networking (TSN) framework for transmitting PRS; and program code to transmit the PRS at the first time point within the TSN framework specified in the PRS transmission request message for transmitting the PRS.

In one implementation, a method performed by a location server in a wireless network of positioning of a user equipment (UE) within the wireless network, includes receiving a first location request message from a first entity requesting locations for the UE at a first time point within a time sensitive networking (TSN) framework; transmitting to one or more entities in the wireless network a second location request message requesting positioning measurements for the UE to be performed at the first time point received in the first location request message; receiving a location information report from the one or more entities based on positioning measurements for the UE performed at the first time point; determining a position estimate for the UE based on the location information report; and transmitting the position estimate for the UE to the first entity.

In one implementation, a location server in a wireless network configured to perform positioning of a user equipment (UE) within the wireless network, includes an external interface configured to wirelessly communicate with a network entity in the wireless network; at least one memory; at least one processor coupled to the external interface and the at least one memory, wherein the at least one processor is configured to: receive, via the external interface, a first location request message from a first entity requesting locations for the UE at a first time point within a time sensitive networking (TSN) framework; transmit, via the external interface, to one or more entities in the wireless network a second location request message requesting positioning measurements for the UE to be performed at the first time point received in the first location request message; receive, via the external interface, a location information report from the one or more entities based on positioning measurements for the UE performed at the first time point; determine a position estimate for the UE based on the location information report; and transmit, via the external interface, the position estimate for the UE to the first entity.

In one implementation, a location server in a wireless network configured to perform positioning of a user equipment (UE) within the wireless network, includes means for receiving a first location request message from a first entity requesting locations for the UE at a first time point within a time sensitive networking (TSN) framework; means for transmitting to one or more entities in the wireless network a second location request message requesting positioning measurements for the UE to be performed at the first time point received in the first location request message; means for receiving a location information report from the one or more entities based on positioning measurements for the UE performed at the first time point; means for determining a position estimate for the UE based on the location information report; and means for transmitting the position estimate for the UE to the first entity.

In one implementation, a non-transitory computer readable storage medium including program code stored thereon, the program code is operable to configure at least one processor in an location server in a wireless network to perform positioning of a user equipment (UE) within the wireless network, includes program code including instructions to receive a first location request message from a first entity requesting locations for the UE at a first time point within a time sensitive networking (TSN) framework; program code to transmit to one or more entities in the wireless network a second location request message requesting positioning measurements for the UE to be performed at the first time point received in the first location request message; program code to receive a location information report from the one or more entities based on positioning measurements for the UE performed at the first time point; program code to determine a position estimate for the UE based on the location information report; and program code to transmit the position estimate for the UE to the first entity.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
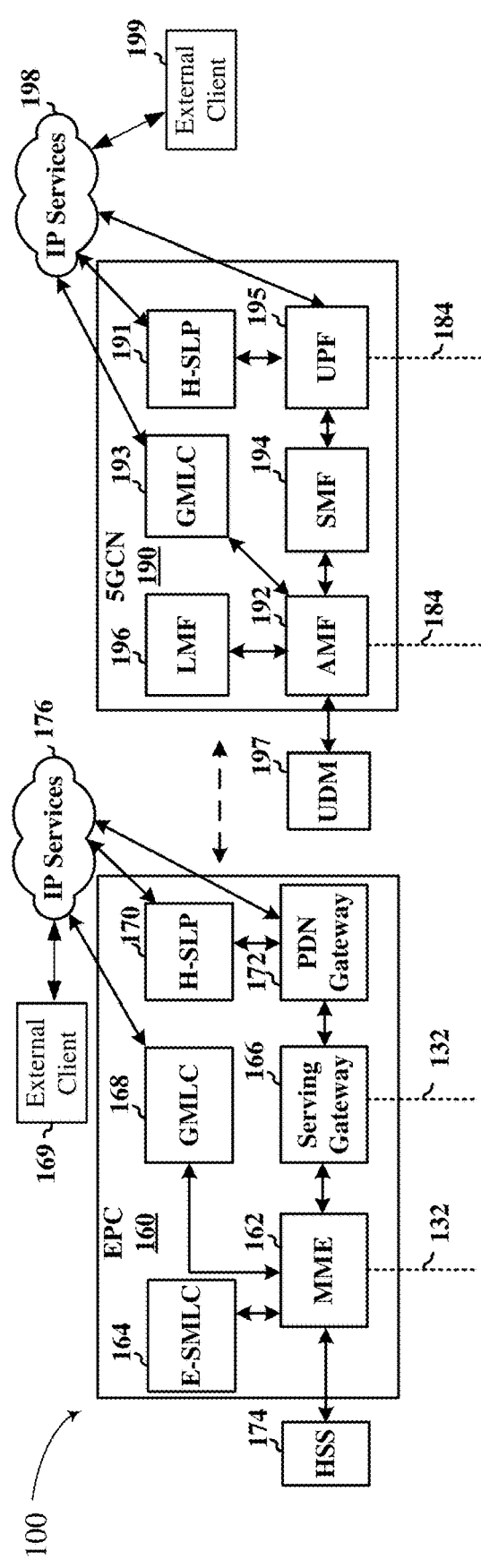
FIG. 1 illustrates an exemplary wireless communications system, according to various aspects of the disclosure.
Figure 1:
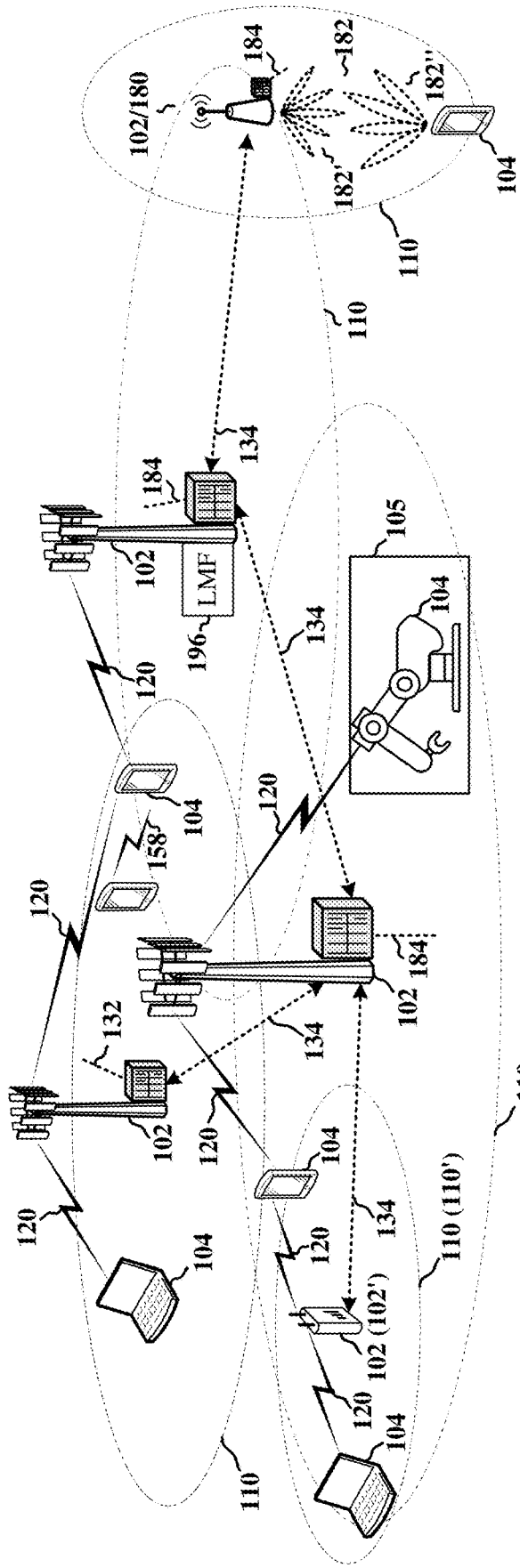

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.), sensors, instruments, and other devices networked together in industrial applications (Industrial Internet of Things (IIot)), used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

Wireless positioning has been proposed for use cases requiring high levels of accuracy and low latency. For example, one proposed implementation is a wireless positioning service for Industrial IoT (IIoT), in which a UE may be, or may be attached to or embedded inside, some tool, object, pan, or component being used in a smart (automated) factory or may be attached to or embedded inside a package, object or component in a smart (automated) warehouse or supply depot. Such UEs may need to be located with high accuracy in order to allow fast, efficient, and smooth operation of the smart factory, warehouse, or supply depot. Industrial control loops that may be implemented in the "Factory of the Future" will rely on accurate positioning information. Several "service levels" with different requirements in terms of accuracy and latency have been specified (by the Third Generation Partnership Project (3GPP)), as indicated in Table 1.

TABLE 1

| Scenario | Horizontal accuracy | Vertical accuracy | Availability | Heading | Latency for position estimation of UE | UE Speed | Corresponding Positioning Service Level in TS 22.261 |
|---|---|---|---|---|---|---|---|
| Mobile control panels with safety functions (non-danger zones) | <5 m | <3 m | 90% | N/A | <5 s | N/A | Service Level 2 |
| Process automation - plant asset management | <1 m | <3 m | 90% | N/A | <2 s | <30 km/h | Service Level 3 |
| Flexible, modular assembly area in smart factories (for tracking of tools at the workplace location) | <1 m (relative positioning) | N/A | 99% | N/A | 1 s | <30 km/h | Service Level 3 |
| Augmented reality in smart factories | <1 m | <3 m | 99% | <0.17 rad | <15 ms | <10 km/h | Service Level 4 |
| Mobile control panels with safety functions in smart factories (within factory danger zones) | <1 m | <3 m | 99.9% | <0.54 rad | <1 s | N/A | Service Level 4 |
| Flexible, modular assembly area in smart factories (for autonomous vehicles, only for monitoring proposes) | <50 cm | <3 m | 99% | N/A | 1 s | <30 km/h | Service Level 5 |
| Inbound logistics for manufacturing (for driving trajectories (if supported by | <30 cm (if supported by further sensors like camera, | <3 m | 99.9% | N/A | 10 ms | <30 km/h | Service Level 6 |

TABLE 1-continued

| Scenario | Horizontal accuracy | Vertical accuracy | Availability | Heading | Latency for position estimation of UE | UE Speed | Corresponding Positioning Service Level in TS 22.261 |
|---|---|---|---|---|---|---|---|
| further sensors like camera, GNSS, IMU) of indoor autonomous driving systems)) | GNSS, IMU) | | | | | | |
| Inbound logistics for manufacturing (for storage of goods) | <20 cm | <20 cm | 99% | N/A | <1 s | <30 km/h | Service Level 7 |

While these requirements for various service levels shown in TABLE 1, have been proposed, how to achieve these requirements, e.g., and integrate within a conventional industrial control loop is not currently understood.

Time-Sensitive Networking (TSN) is a set of standards under development within the IEEE 802.1 Working Group within the Institute of Electrical and Electronics Engineers Standards Association. TSN targets very low latency and high availability of real-time control streams in industrial facilities. There are three basic components within the TSN specification. One component is time synchronization, e.g., every node within the communication network is required to have a common understanding of time. Another component is the scheduling and traffic shaping, e.g., all nodes are required to process and forward communication packets by respecting same rules. Another component is communication paths selection, in which the path reservation and fault tolerance are specified by the shared rules. TSN was initially developed for Ethernet networks, but has been proposed to extend to work with wireless networks, such as Fifth Generation (5G) wireless network, to utilize the full potential of industrial control combined with mobile sensors/actuators. However, no existing solutions for wireless networks appear able to achieve the necessary time synchronization component for TSN.

FIG. 1 shows a diagram of an example wireless network 100. The wireless communications system (also referred to as a wireless wide area network (WWAN)) includes base stations 102, UEs 104, and one or more core networks, illustrated as an Evolved Packet Core (EPC) 160 and a Fifth Generation Core (5GC) 190. While two core networks are shown the wireless communications system may use only one core network, e.g., the 5GC 190. The base stations 102 may include macrocells (high power cellular base station) or small cells (low power cellular base station). The macrocells include base stations. The small cells include femtocells, picocells, and microcells.

The base stations 102 configured for 4G LTE, referred to as eNodeBs (eNBs), (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR, referred to as gNodeBs (gNBs), (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL).

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The small cell 102' may operate in a licensed or an unlicensed frequency spectrum. When operating in an unlicensed frequency spectrum, the small cell 102' may employ NR and use the same 5 GHz unlicensed frequency spectrum as used by a Wi-Fi AP. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 104 and the 5GC 190 and which, for positioning functionality, may communicate with the LMF 196, which may support location determination of UEs. In some implementations, the LMF 196 may be co-located with a base station 102 in the NG-RAN and may be referred to as a Location Management Component (LMC). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198 The IP Services 198 may include the Internet, an intranet, an IP Multimedia Subsystem (IMS), a PS Streaming Service, and/or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). Some of the UEs 104 may be referred to as IIoT devices, such as sensors, instruments, and other devices networked together, in an industrial application, e.g., within a factory 105. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2A:
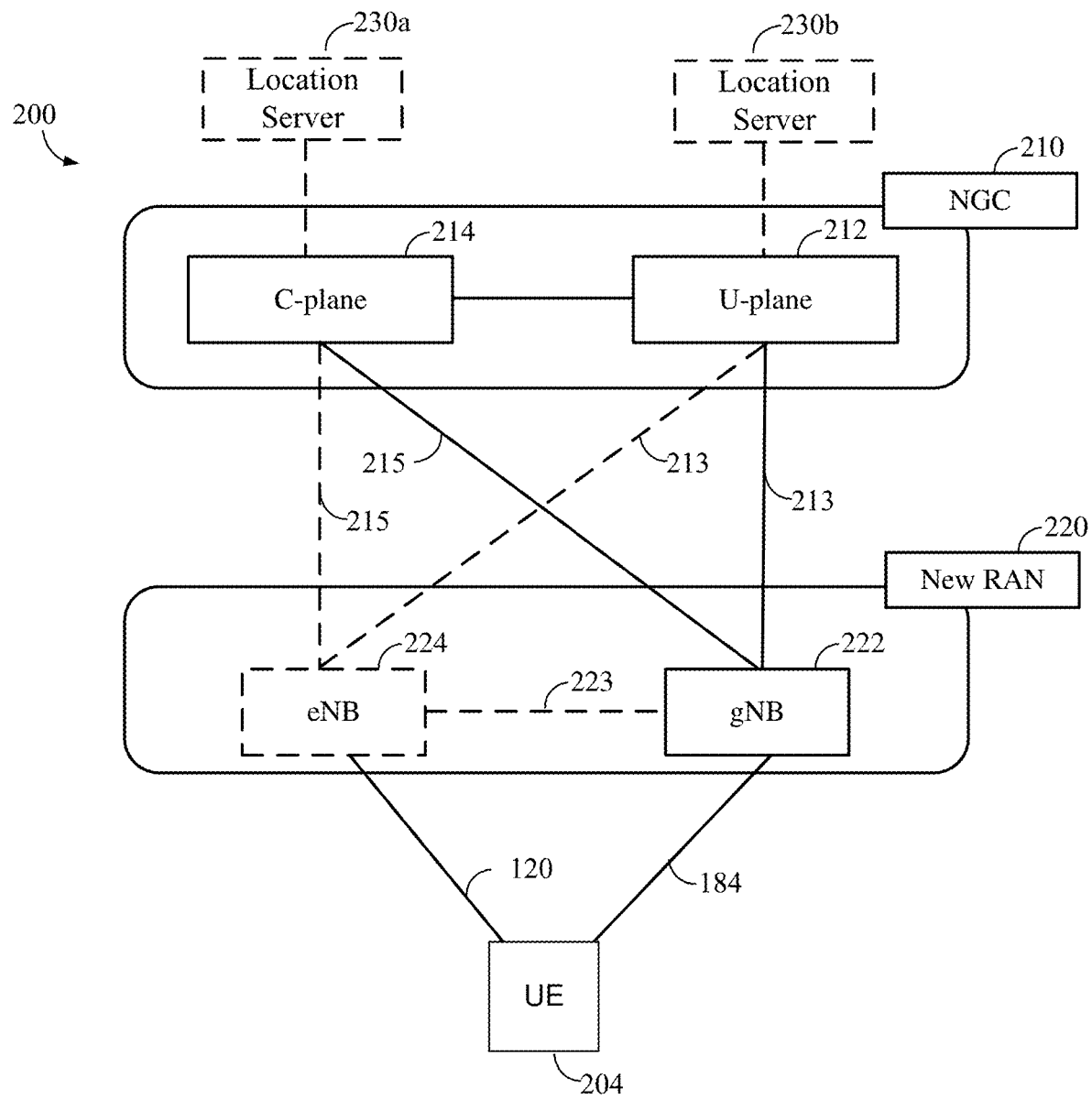
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to LMF 196), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
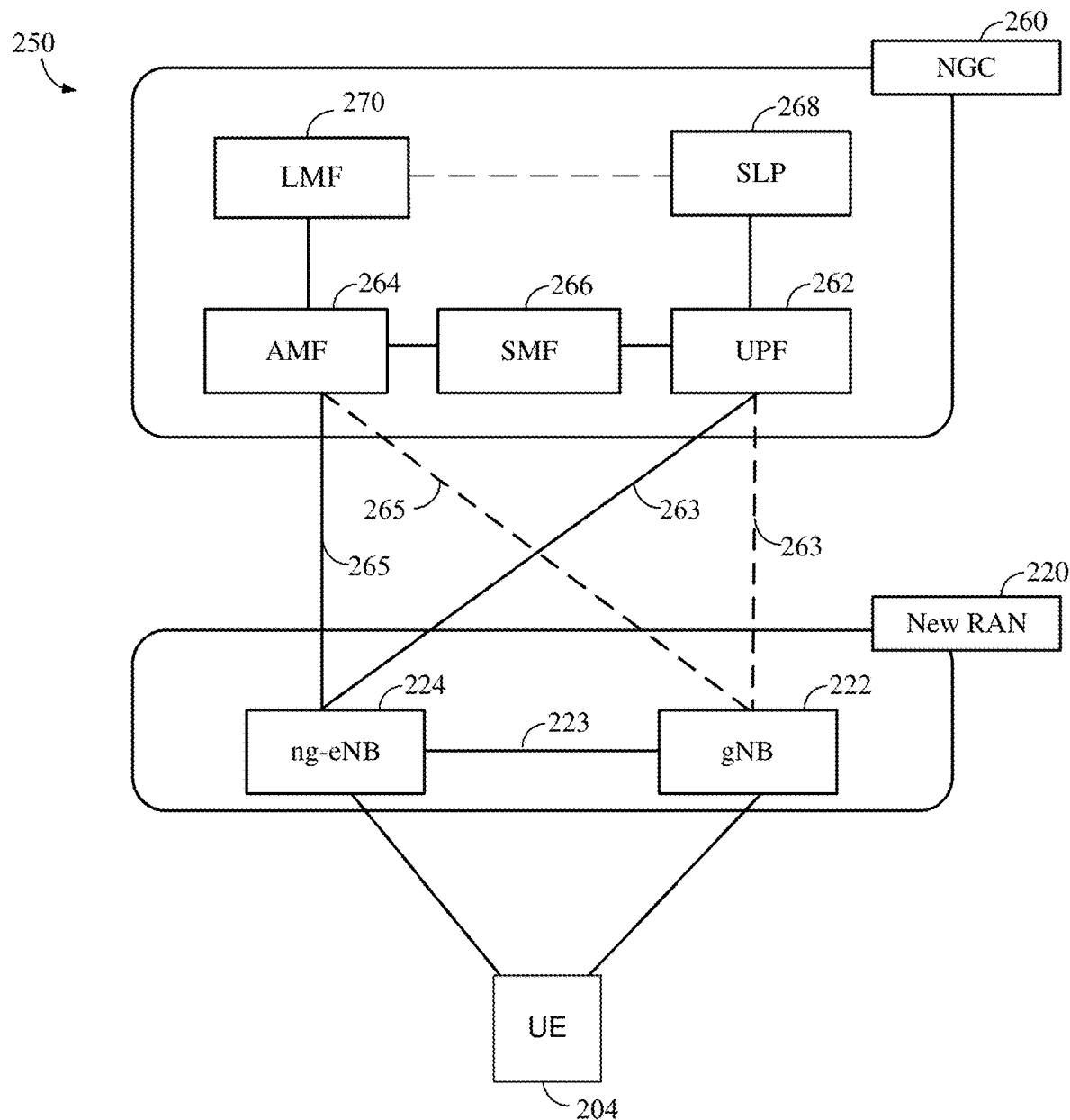

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to LMF 196), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
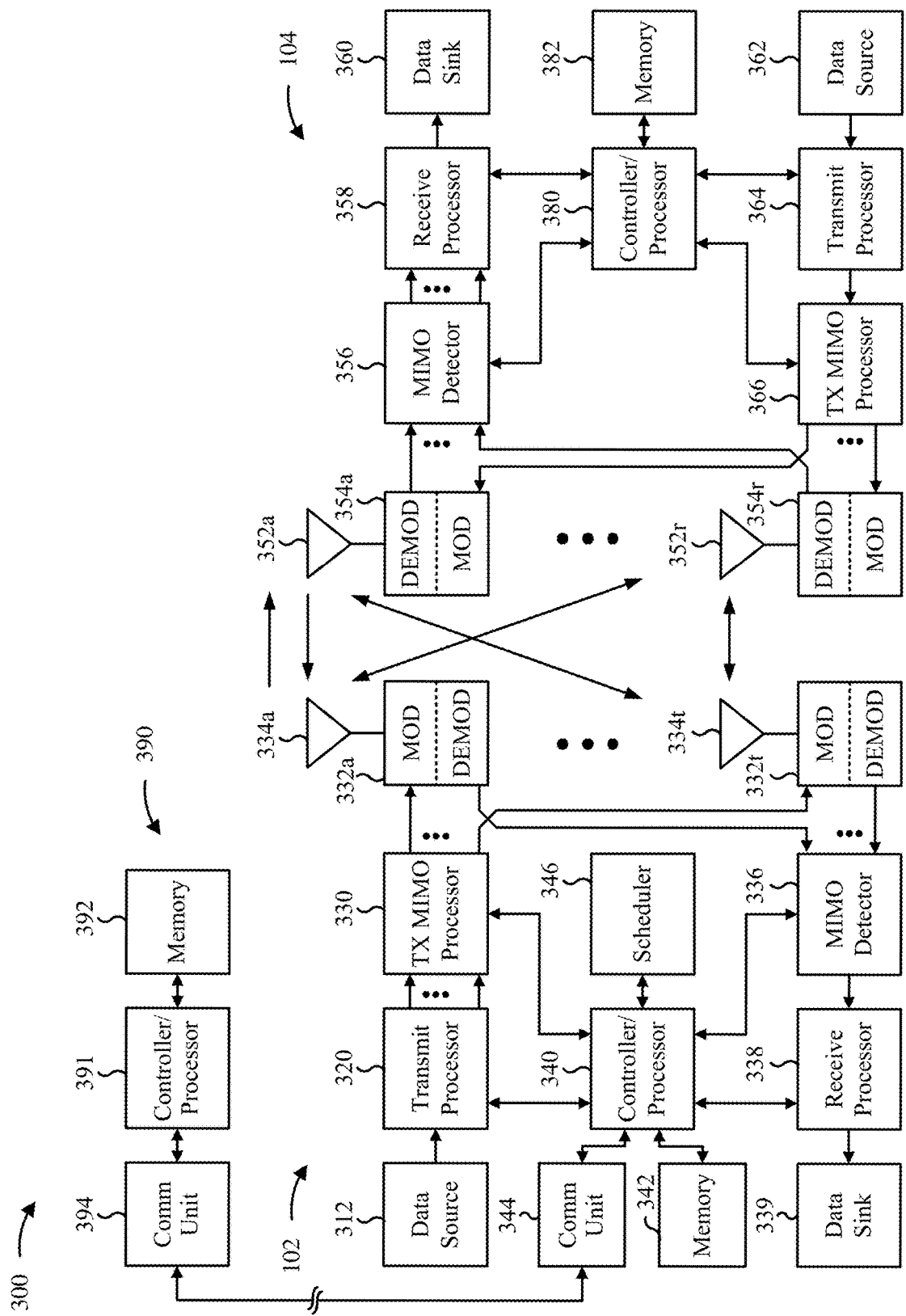
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to location server 390 via communication unit 344. Location server 390, for example, may be LMF 196 or E-SMLC 164. Location server 390 may include communication unit 394, controller/processor 391, and memory 392.

Controller/processor 340 of base station 102, controller/processor 380 of UE 104, and/or controller/processor 391 of location server 390 of FIG. 3 may perform one or more techniques associated with performing positioning of a UE within the TSN framework, as described in more detail elsewhere herein. For example, controller/processor 340 of base station 102, controller/processor 380 of UE 104, and/or controller/processor 391 of location server 390 may perform or direct operations of, for example, process 1100 of FIG. 11, process 1200 of FIG. 12, process 1300 of FIG. 13, and/or other processes as described herein. Memories 342, 382, and 392 may store data and program codes for base station 102, UE 104, and location server 390, respectively. In some aspects, memory 342, and/or memory 382, and/or memory 392 may comprise a non-transitory computer-readable medium storing one or more instructions for wireless communication. For example, the one or more instructions, when executed by one or more processors of the base station 102, the UE 104, or the location server 390, may perform or direct operations of, for example, process 1100 of FIG. 11, process 1200 of FIG. 12, or process 1300 of FIG. 13, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
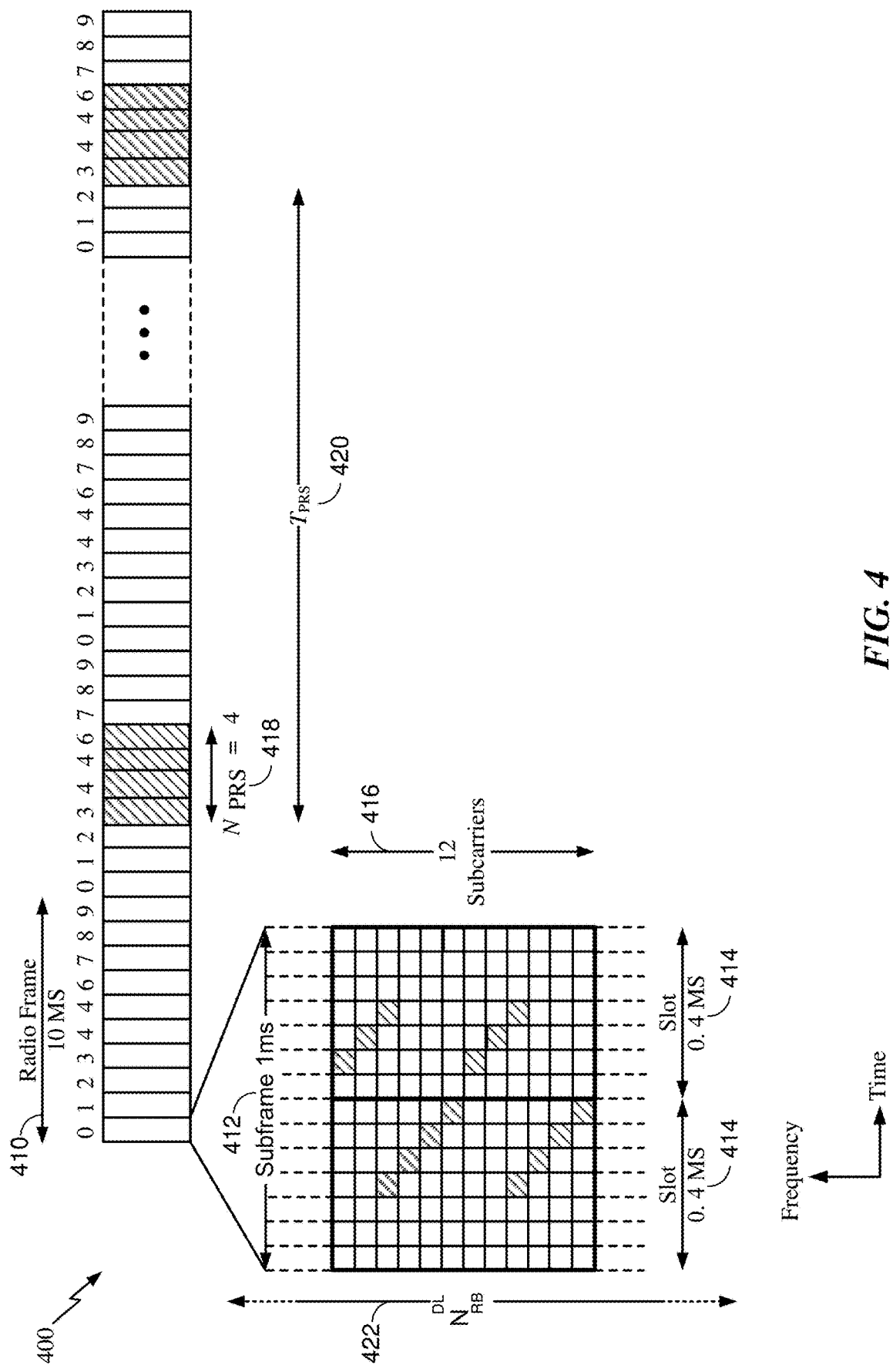
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE 104 may transmit UL PRS for positioning. The UL PRS may be sometimes referred to as sounding reference signals (SRS) for positioning. Using received DL PRS from base stations and/or UL PRS transmitted to base stations, the UE may perform various positioning methods, such as time of arrival (TOA), reference signal time difference (RSTD), time difference of arrival (TDOA), reference signal received power (RSRP), time difference between reception and transmission of signals (Rx-Tx), Angle of Arrival (AoA) or Angle of Departure (AoD), etc. In some implementations, the DL PRS and UL PRS are received and transmitted jointly to perform Round Trip Time (RTT) positioning measurements with one or multiple base stations (multi-RTT).

Figure 5:
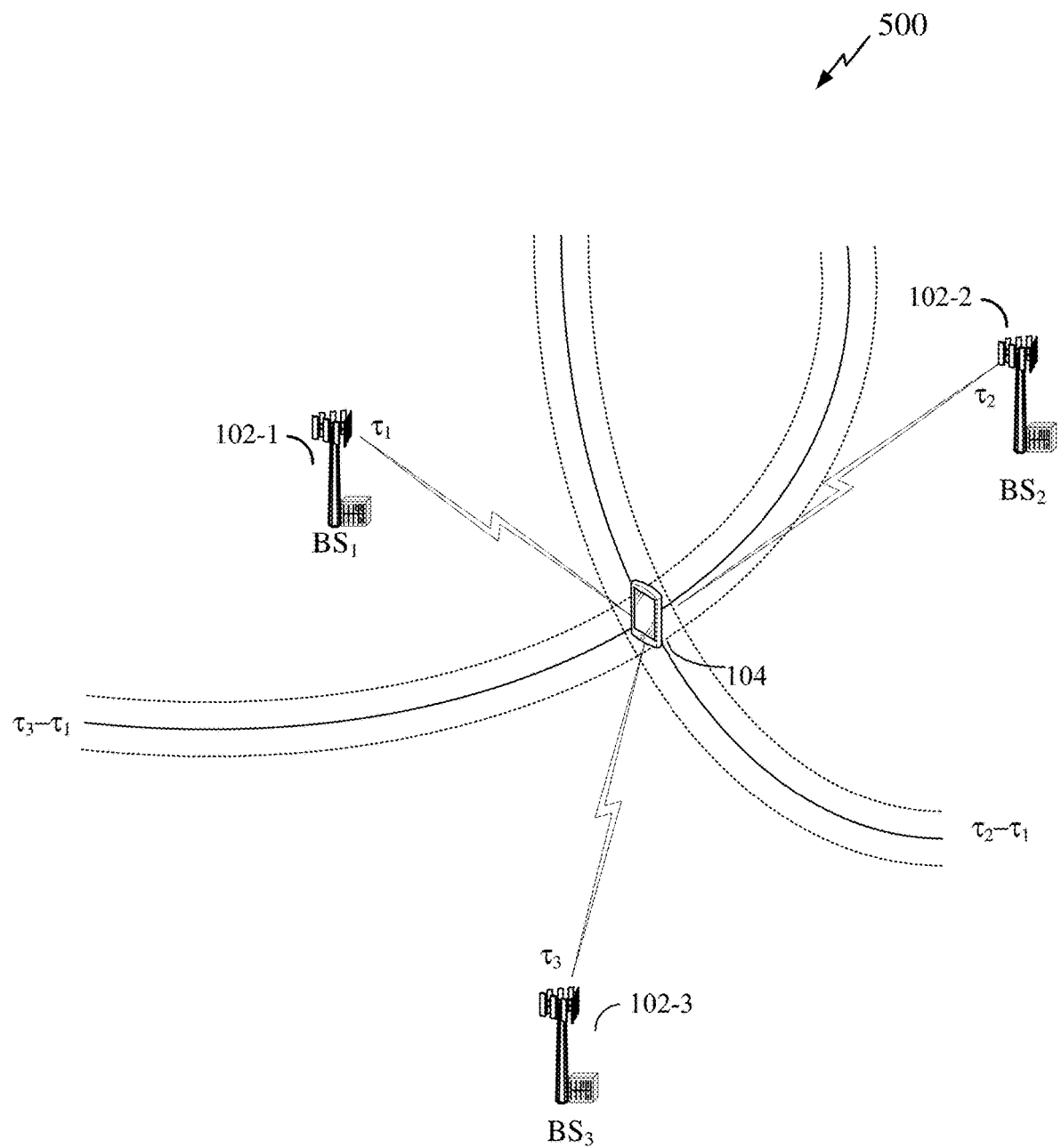
FIG. 5 illustrates an exemplary wireless communications system implementing positioning using a Time Difference of Arrival (TDOA) technique.

FIG. 5 illustrates an exemplary wireless communications system 500 implementing positioning using a Time Difference of Arrival (TDOA) technique. In the example of FIG. 5, a UE 104 is attempting to calculate an estimate of its position, or assist another entity (e.g., a base station or core network component, another UE, a location server, a third party application, etc.) to calculate an estimate of its position. The UE 104 may communicate wirelessly with a plurality of base stations 102-1, 102-2, and 102-3 (collectively, base stations 102), which may correspond to any combination of base stations 102 in FIG. 1, using RF signals and standardized protocols for the modulation of the RF signals and the exchange of information packets. By extracting different types of information from the exchanged RF signals, and utilizing the layout of the wireless communications system 500 (i.e., the base stations' locations, geometry, etc.), the UE 104 may determine its position, or assist in the determination of its position, in a predefined reference coordinate system. In an aspect, the UE 104 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 104 and three base stations 102, as will be appreciated, there may be more UEs 104 and more or fewer base stations 102.

To support position estimates, the base stations 102 may be configured to broadcast reference RF signals (e.g., PRS, CRS, CSI-RS, synchronization signals, etc.) to UEs 104 in their coverage area to enable a UE 104 to measure characteristics of such reference RF signals. For example, the UE 104 may use the OTDOA positioning method, and the UE 104 may measure the RSTD between specific reference RF signals (e.g., PRS, CRS, CSI-RS, etc.) transmitted by different pairs of network nodes (e.g., base stations 102, antennas of base stations 102, etc.).

Generally, RSTDs are measured between a reference network node (e.g., base station 102-1 in the example of FIG. 5) and one or more neighbor network nodes (e.g., base stations 102-2 and 102-3 in the example of FIG. 5). The reference network node remains the same for all RSTDs measured by the UE 104 for any single positioning use of OTDOA and would typically correspond to the serving cell for the UE 104 or another nearby cell with good signal strength at the UE 104. In an aspect, where a measured network node is a cell supported by a base station, the neighbor network nodes would normally be cells supported by base stations different from the base station for the reference cell and may have good or poor signal strength at the UE 104. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., LMF 196) may provide OTDOA assistance data to the UE 104 for the reference network node (e.g., base station 102-1 in the example of FIG. 5) and the neighbor network nodes (e.g., base stations 102-2 and 102-3 in the example of FIG. 5) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 104 as the reference network node.

In an aspect, while the location server (e.g., LMF 196) may send the assistance data to the UE 104, alternatively, the assistance data can originate directly from the network nodes (e.g., base stations 102) themselves (e.g., in periodically broadcasted overhead messages, etc.). Alternatively, the UE 104 can detect neighbor network nodes itself without the use of assistance data.

In the example of FIG. 5, the measured time differences between the reference cell of base station 102-1 and the neighboring cells of base stations 102-2 and 102-3 are represented as $\tau_2 - \tau_1$ and $\tau_3 - \tau_1$, where $\tau_1$, $\tau_2$, and $\tau_3$ represent the transmission time of a reference RF signal from the transmitting antenna(s) of base station 102-1, 102-2, and 102-3, respectively, to the UE 104, and includes any measurement noise at the UE 104. The UE 104 may then convert the ToA measurements for different network nodes to RSTD measurements (e.g., as defined in 3GPP TS 36.214 entitled "Physical layer; Measurements") and (optionally) send them to the location server (e.g., LMF 196). Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 104 position may be determined (either by the UE 104 or the location server (e.g., LMF 196)).

The ToA $T_i$ at the UE 104 for the shortest path from base station i is $T_i = \tau_i + D_i/c$, where $D_i$ is the Euclidean distance between the base stations i with location ($q_i$) and the UE 104 with location (p), c is the speed of light in the air (299700 km/s), and $q_i$ is known through the cell information database. The Euclidean distance (i.e., the line distance between two points) is given by:

$$c(T_i - \tau_i) = \sqrt{2}\, R\sqrt{1 - \sin(\varphi_1)\sin(\varphi_2) - \cos(\varphi_1)\cos(\varphi_2)\cos(\beta_1 - \beta_2)},$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 104 first jointly processes all the resource elements (REs) on the channel on which that network node (e.g., base station 102) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 104 may choose a ToA estimate that is the earliest local maximum of the CER that is at least X dB higher than the median of the CER and a maximum Y dB lower than the main peak on the channel. The UE 104 determines the CER for each reference RF signal from each network node in order to determine the ToA of each reference RF signal from the different network nodes.

When the UE 104 obtains a location estimate itself using OTDOA measured time differences, the necessary additional data (e.g., network nodes' locations and relative transmission timing) may be provided to the UE 104 by a location server (e.g., LMF 196). In some implementations, a location estimate for the UE 104 may be obtained (e.g., by the UE 104 itself or by the location server (e.g., LMF 196)) from OTDOA measured time differences and from other measurements made by the UE 104 (e.g., measurements of signal timing from GPS or other GNSS satellites). In these implementations, known as hybrid positioning, the OTDOA measurements may contribute towards obtaining the UE's 104 location estimate but may not wholly determine the location estimate.

Uplink Time Difference of Arrival (UTDOA) is a similar positioning method to OTDOA, but is based on uplink reference RF signals, e.g., UL PRS or SRS transmitted by the UE (e.g., UE 104). Further, transmission and/or reception beamforming at the network node and/or UE 104 can enable wideband bandwidth at the cell edge for increased precision. Beam refinements may also leverage channel reciprocity procedures in 5G NR.

Figure 6:
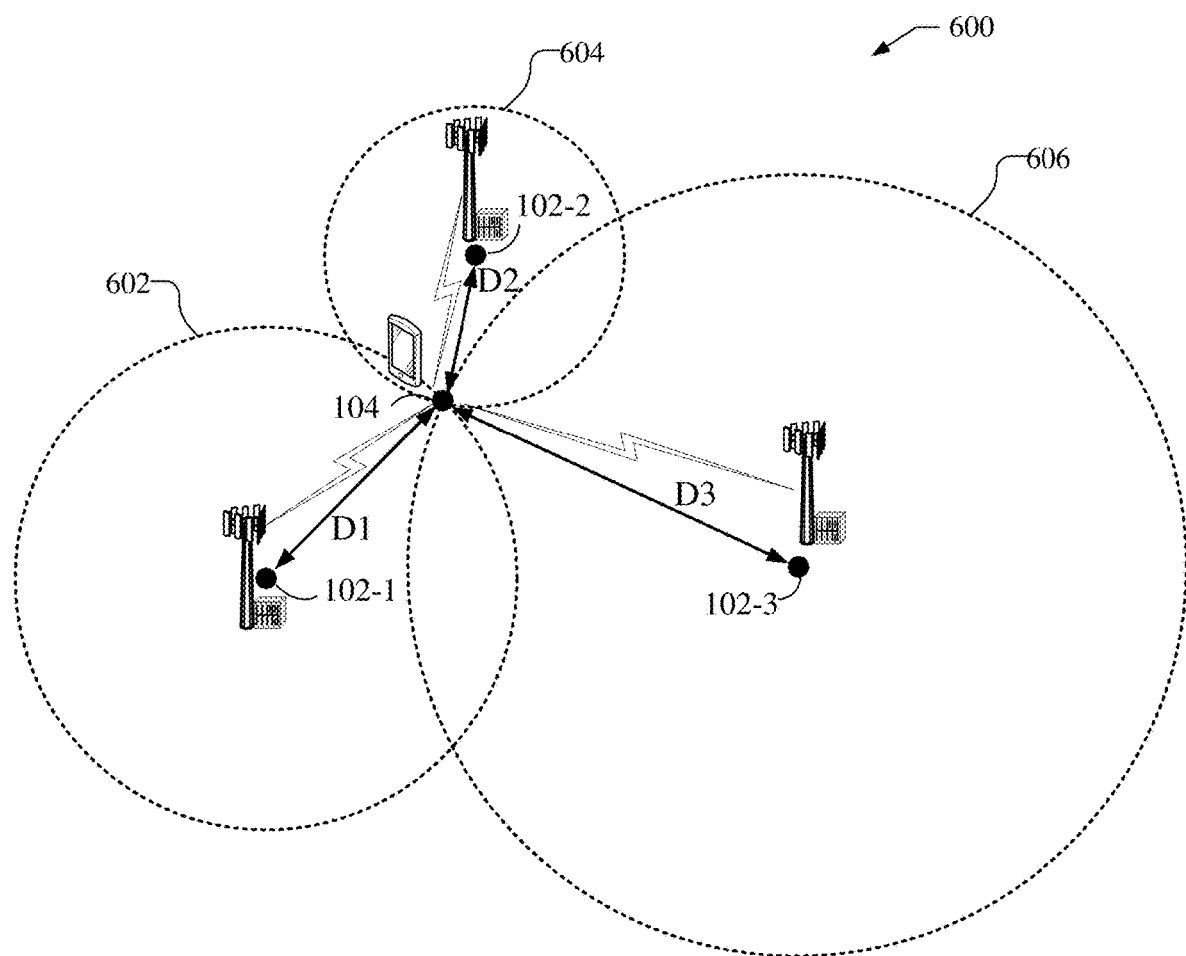
FIG. 6 illustrates an exemplary wireless communications system implementing positioning using a Round Trip Time (RTT) with multiple base stations (multi-RTT) technique.

FIG. 6 illustrates an exemplary wireless communications system 600 implementing positioning using a Round Trip Time (RTT) with multiple base stations 102 (multi-RTT) technique. For example, both the UE 104 and the base stations 102 may transmit PRS, from which Rx-Tx may be measured. The base stations 102, for example, for example, may provide the UE 104 with the time of transmission of their DL PRS signals and the time of arrival of the UL PRS from the UE 104, from which the UE 104 may determine the Rx-Tx and the RTT for each base station 102.

In order to determine the position of the UE 104, some information regarding the network geometry must be known. [are we sure that the network geometry must be known?—it seems that locations of the base stations are needed but network geometry may include additional information, e.g. GDOP, that may not be needed to determine the position of the UE] The network geometry, for example, may include the geographic location of each of the base station 102 in a reference coordinate system. For a UE based positioning procedure, the network geometry may be provided to the UE 104 in any manner, such as, for example, providing the information in beacon signals, providing the information using a server, e.g., in positioning assistance data, providing the information using uniform resource identifiers, etc.

As illustrated, the distances D1, D2, and D3 between UE 104 and respective base stations 102-1, 102-2, 102-3 is determined, using RTT. With the distance to each base station 102 known and the position of each base station known, the position of the UE 104 may be solved using a variety of known geometric techniques, such as, for example, trilateration. From FIG. 6, it can be seen that circles 602, 604, and 606 centered on respective base stations 102-1, 102-2, 102-3 have radii equal to the distances D1, D2, and D3. The position of the UE 104 ideally lies at the common intersection of all of the circles 602, 604, and 606.

Other known positioning techniques may be performed to determine the location of the UE 104 using DL and/or UL wireless signals, such as Angle of Arrival (AoA) or Angle of Departure (AoD), etc.

As discussed above, a wireless system 100 may be used in various applications for accurate positioning. For example, a UE 104 may be, or may be attached to or embedded inside, a tool, object, part, or component being used in a smart (automated) factory or may be attached to or embedded inside a package, object, or component in a smart (automated) warehouse or supply depot. For example, a UE 104 may be used in a motion control system, e.g., as discussed in 3GPP Technical Report (TR) 22.804. A motion control system is used for control of moving and/or rotating parts of machines in a well-defined manner.

Figure 7:
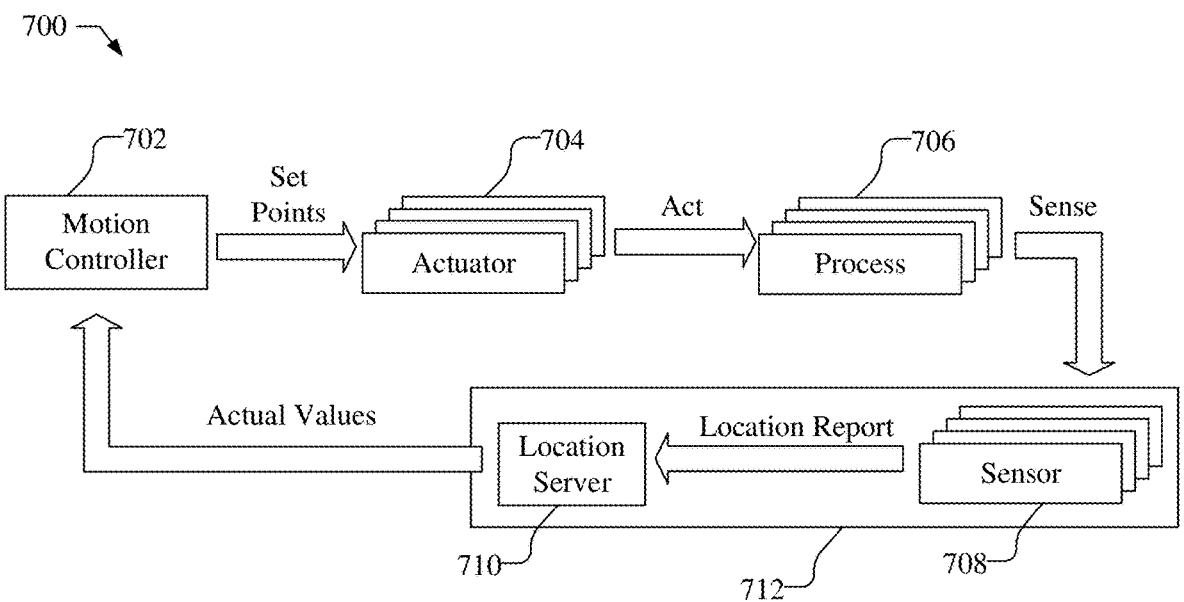
FIG. 7 illustrates a motion control system in a Time-Sensitive Networking (TSN) framework that may include a UE as a position sensor.

FIG. 7, by way of example, illustrates a motion control system 700 that may include a UE 104 as a position sensor.

As illustrated, a motion controller 702 may periodically send desired set points to one or several actuators 704, which may be, e.g., linear actuators or servo drives. The actuators 704 perform a corresponding action on one or several processes 706, e.g., such as a movement or rotation of one or more components. At the same time, sensors 708 determine the current state of the process(es) 706, e.g., for example the current position and/or rotation of the one or more components. Some or all of the sensors 708 may include a UE 104 and base station 102. Using wireless signals, such as DL PRS and/or UL PRS, the UE 104 and/or base station 102 may perform positioning measurements. The UE 104 and/or base station 102 may provide to a location server 710 a location report with information related to the positioning measurements, such as the positioning measurements (e.g., in a UE assisted positioning process) or a position estimate (e.g., in a UE based positioning process). The location server 710 may determine the position estimate for the UE 104 based on the received location report. The location server 710 sends the actual values, e.g., positions of the UEs 104, back to the motion controller 702. Thus, the sensors 708 (including UE 104 and gNB 102) and the location server 710 operate together as illustrated by box 712 to measure and provide the actual values of the sensor positions to the motion control 702.

The motion control is done in a strictly cyclic and deterministic manner, such that during one communication cycle time $T_{cycle}$ the motion controller 702 sends updated set points to all 704 actuators, and all sensors 708 send their actual values back to the motion controller 702, via location server 710 when the sensor 708 includes a UE 104 and/or gNB 102. For example, within each communication cycle of duration $T_{cycle}$, the following steps are performed in a strictly cyclic manner. The motion controller 702 may send set points to all actuators 704. The actuators 704 may take these set points and place them into an internal buffer. All sensors, including the UE 104, transmit their current actual values from their internal buffer to the motion controller 702, via location server 710. Moreover, at a well-defined time point within the current cycle, which is commonly referred to as the "global sampling point", the actuators 704 retrieve the latest set points received from the motion controller 702 from their internal buffer and act accordingly on the process(es) 706. At the same time, the sensors 708, including the UE 104 and/or gNBs 102, measure the current state of the process(es) 706 and provide measurement information to the location server 710, which transmits the new actual values to the motion controller 702. A very high synchronicity, e.g., in the order of 1 μs, is desired between all involved devices (motion controller 702, sensors 708, actuators 704) with respect to the global sampling point.

By way of example, Table 2 provides typical values for the number of nodes, cycle times and payload sizes for printing machines, machine tools or packaging machines, which are a few application areas for motion control systems.

TABLE 2

| Application | # of sensors/actuators | Typical message size | Cycle time $T_{cycle}$ | Service area |
|---|---|---|---|---|
| Printing Machine | >100 | 20 bytes | < 2 ms | 100 m × 100 m × 30 m |
| Machine Tool | ~20 | 50 bytes | < 0.5 ms | 15 m × 15 m × 3 m |
| Packaging Machine | ~50 | 40 bytes | < 1 ms | 10 m × 5 m × 3 m |

For integration of a wireless network in a TSN framework, the time between the two systems is synchronized. The TSN framework has been fully redefined and extended to a wireless network, such as 5G.

Figure 8:
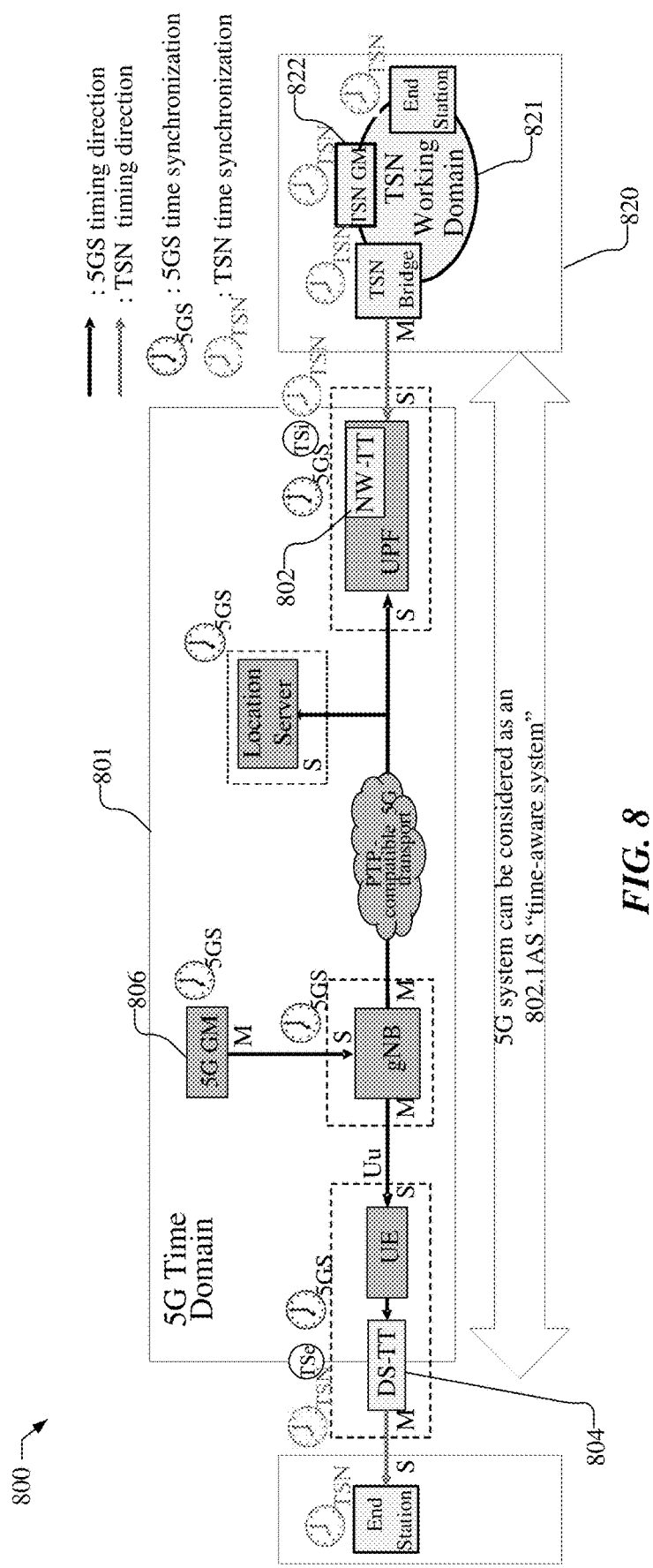
FIG. 8 illustrates a 5G and TSN clock distribution model for clock synchronization.

FIG. 8 illustrates the 5G and TSN clock distribution model 800 via a 5G system (5GS) 801, as described in 3GPP TR 23.501. For supporting TSN time synchronization, the 5GS is integrated with the external network as a TSN bridge as described in 3GPP TR 23.501. The 5GS may be modelled as an IEEE 802.1AS compliant entity. For TSN Synchronization, the entire E2E 5G system may be considered as an IEEE 802.1AS "time-aware system". Only the TSN Translators (TTs) at the edges of the 5G system 801 need to support the IEEE 802.1AS operations. The UE 104, gNB 102, UPF 195, NW-TT 802 and DS-TTs 804 are synchronized with the 5G grandmaster clock (GM) 806 (i.e. the 5G internal system clock) which keeps these network elements synchronized. The TTs 802 and 804 located at the edge of 5G system 801 may fulfill all functions related to IEEE 802.1AS, e.g. (g)PTP support, timestamping, Best Master Clock Algorithm (BMCA), rateRatio.

The 5G and TSN clock distribution model 800 depicts the two synchronizations systems considered: the 5GS 801 synchronization and the TSN domain 820 synchronization, as well as the Master (M) and Slave (S) ports considered when the TSN grandmaster (GM) clock 822 is located at the TSN working domain 821. The 5GS 801 synchronization may be used for NG RAN synchronization, e.g., as specified in 3GPP TS 38.331. The TSN domain 820 synchronization provides synchronization service to a TSN network, and may follow IEEE 802.1AS. The two synchronization processes may be considered independent from each other and the gNB 102 (and in some implementations, the location server 803 (which may be the LMF 196) may only need to be synchronized to the 5G GM clock 806. To enable TSN synchronization, the 5GS 801 may calculate and add the measured residence time between the TTs 802 and 804 into the Correction Field (CF) of the synchronization packets of the TSN working domain.

Thus, time synchronization between a TSN domain and a wireless network, e.g., 5GC domain, are possible. Currently, however, wireless positioning cannot support the synchronicity required within a TSN working domain. For example, current wireless positioning permits periodic reporting, e.g., as described in 3GPP TS 37.355. Table 3 shows a portion of the field descriptions from 3GPP TS 37.355.

TABLE 3

CommonIEsRequestLocationInformation field descriptions periodicalReporting
This IE indicates that periodic reporting is requested and comprises the following subfields:
    reportingAmount . . .
    reportingInterval indicates the interval between location information reports and the response time requirement for the first location information report.
    Enumerated values ri0-25, ri0-5, ri1, ri2, ri4, ri8, ri16, ri32, ri64 correspond to reporting intervals of 1, 2, 4, 8, 10, 16, 20, 32, and 64
    seconds, respectively . . .
additionalInformation
This IE indicates whether a target device is allowed to return additional information to that requested . . .
qos
This IE indicates the quality of service and comprises a number of sub-fields. In the case of measurements, some of the sub-fields apply to the location estimate that could be obtained by the server from the measurements provided by the target device assuming that the measurements are the only sources of error. Fields are as follows:
    horizontalAccuracy . . .
    verticalCoordinateRequest . . .
    verticalAccuracy . . .
    responseTime
        time indicates the maximum response time as measured between receipt of the RequestLocationInformation and transmission of aProvideLocationInformation. If the unit field is
        absent, this is given as an integer number of seconds between 1
        and 128. If the unit field is present, the maximum response time
        is given in units of 10-seconds, between 10 and 1280 seconds. If
        the periodicalReporting IE is included in CommonIEsRequestLocationInformation, this field should not be included by the location server and shall be ignored by the target device (if included).
        responseTimeEarlyFix indicates the maximum response time as
        measured between receipt of the RequestLocationInformation and transmission of a ProvideLocationInformation containing early location measurements or an early location estimate... A server should set the responseTimeEarlyFix IE to a value less than that for the time IE. A target shall ignore the responseTimeEarlyFix IE if its value is not less than that for the
        time IE.
        . . .

Thus, periodic reporting as currently implemented under 3GPP TS 37.355, does not support a motion control system or other use case, e.g., as defined by 3GGP TR 22.804, discussed above. For example, the reporting period under 3GPP TS 37.355 is too long, e.g., 1, 2, 4, 8, 10, 16, 20, 32, and 64 seconds, whereas a few ms are required for motion control systems, such as those discussed above. Moreover, the concept of "period" under 3GPP TS 37.355, allows every node to have a different response time, and accordingly, fails to achieve the synchronicity required within the control loop for a motion control system as discussed above.

To integrate a wireless positioning system, e.g., UE 104, as a sensor within the TSN framework for motion control or other similar use cases, the positioning measurements performed by the UE 104 and/or the base station 102 may be performed at a well-defined time point within a current cycle, e.g., control loop, such as the global sampling point, as discussed in reference to FIG. 7 to provide the desired synchronicity. The well-defined time point for example, may be, e.g., a phase within the period, which may also be referred to as a burst arrival time.

Similar to Time Sensitive Communication (TSC) Assistance Information discussed in 3GPP TS 23.501 which contains a Burst Arrival Time, the Request/Provide Location Information LPP message types should contain an optional additional information with the time point, e.g., the global sampling point, that allows to track period and phase at which the positioning fix is expected.

The use of a defined time point for position measurement may be for both UE-assisted or UE-based positioning processes. Additionally, defined time points may be used for reporting position estimates. For example, as illustrated in FIG. 7, the location server 710 will ultimately return the position estimate to the motion controller 702, and accordingly, it may be advantageous for the location server 710 to have access to a define time point, e.g., the global sampling point.

Additionally, the latency, e.g., the time gap between the positioning measurement at the defined time point, e.g., the global sampling point, and the location fix reaching the motion controller, may be determined, e.g., based on time stamps provided with the positioning measurements and/or the position estimate.

Thus, the UE 104, the base stations 102, and the location server 710 may share the notion of a well-defined time point during the measurement period, e.g., the global sampling point, and may be time synchronized according to the TSN framework.

Figure 9:
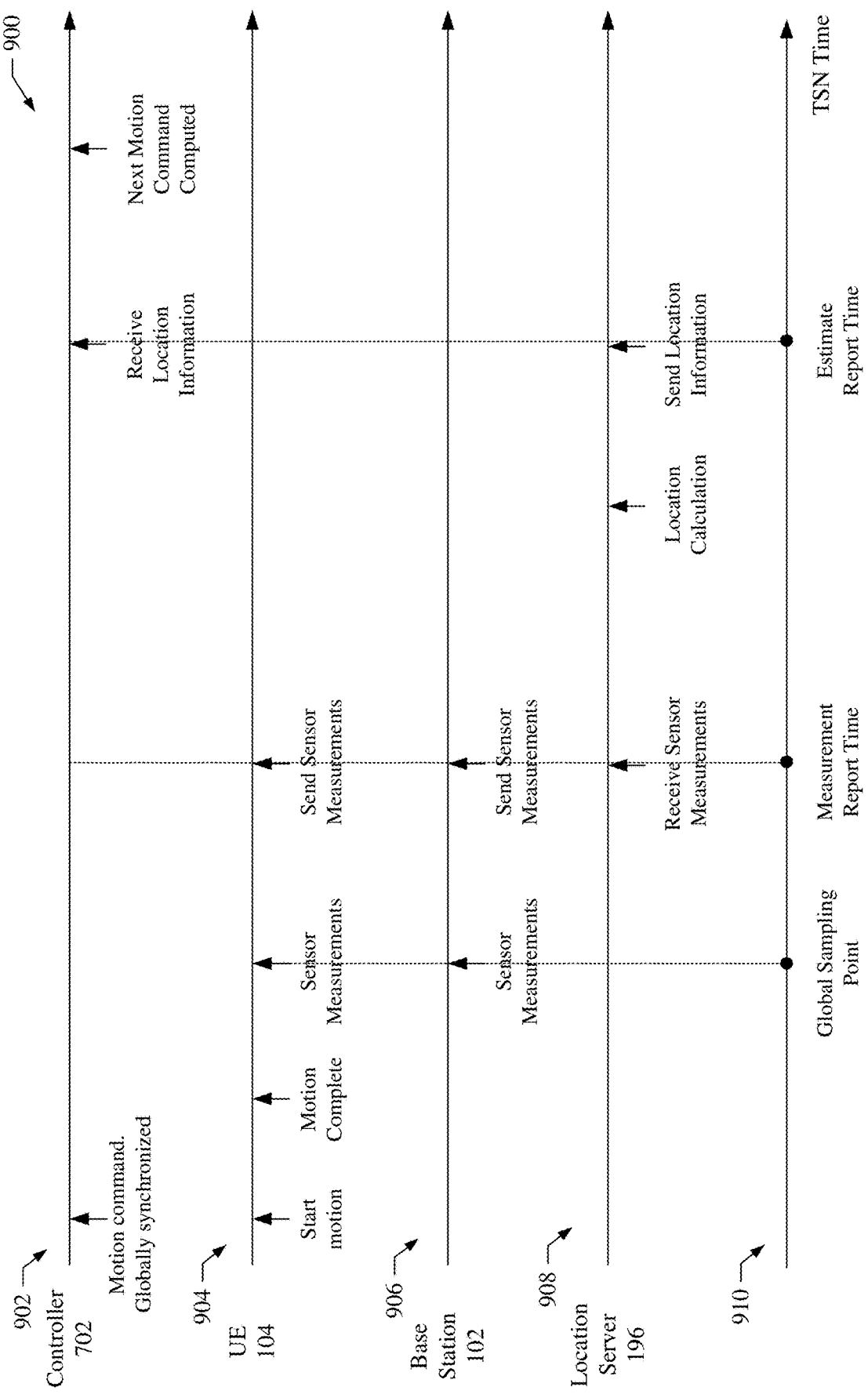
FIG. 9 illustrates aligned timelines for a controller, UE, base station, location server, and TSN time.

FIG. 9 illustrates aligned timelines 900 including a controller 702 timeline 902, a UE 104 timeline 904, a base station 102 timeline 906, a location server 196 timeline 908, and the TSN time 910. The controller 702, UE 104, base station 102, and in some implementations, the location server 196 are synchronized in time based on the TSN framework (e.g., TSN time). The timelines 900 illustrate a single control cycle and show events and actions performed by the different entities in relation to each other and the TSN time 910. The control cycle may be periodic, and thus, the events illustrated in FIG. 9 may repeat for a set number of cycles or until a termination message is issued.

As illustrated on controller timeline 902, the controller 702 provides a motion command, e.g., to actuators 704 shown in FIG. 7, that is globally synchronized. In response, the actuators initiate the motion. The UE 104 serves as a motion/position sensor, and accordingly, the UE timeline 904 shows start motion aligned with the motion command on the controller timeline 902. After a time, the motion may be complete, as illustrated on the UE timeline 904. In some implementations, the motion may continue through the entire control cycle.

At the global sampling point shown in the TSN time 910, the UE 104 and/or base station 102 performs positioning measurements, as illustrated by sensor measurements on the UE timeline 904 and base station timeline 906. For example, in some implementations, only DL positioning measurements may be performed by the UE 104, or only UL positioning measurements may be performed by the base station 102, or both DL and UL positioning measurements may be performed by the UE 104 and the base station 102. As illustrated, the positioning measurements are closely aligned with a defined time point, e.g., the global sampling point, e.g., within 1 μs. Subsequently, the UE 104 and/or base station 102 send the positioning measurements to the location server 196, as illustrated by the send sensor measurements on the UE timeline 904 and base station timeline 906 and receive sensor measurements on the location server timeline 908. The positioning measurements may include, e.g., time stamps. In some implementations, additional messages may be transmitted between the UE 104 and base station 102, e.g., providing measurement information, such as the time of transmission or time of arrival of PRS signals. Additionally, in some implementations, e.g., a UE based process, the UE 104 may determine a position estimate and the sensor measurements provided by the UE 104 may include the position estimate. As illustrated on the TSN time 910, the transmission of the positioning measurements by the UE 104 and/or base station 102 may be at (or before) a defined time point, e.g., the measurement report time.

The location server 196 determines a position estimate for the UE 104 based on the received positioning measurements. For example, the location server 196 may determine the position estimate using the positioning measurements received from the UE 104 and/or the base station 102. Alternatively, the sensor measurements from the UE 104 may include the position estimate and the location server 196 may use the UE 104 determined position estimate and/or may confirm the position estimate. Subsequently, the location server 196 sends location information including the position estimate to the controller 702, as illustrated by the send location information on the location server timeline 908 and receive location information on the controller timeline 902. The location information may include the time stamps for the positioning measurements. As illustrated on the TSN time 910, the transmission of the location information by the location server 196 may be at (or before) a defined time point, e.g., the estimate report time. The controller 702 may determine the next motion command, as illustrated by the next motion command computed on the controller timeline 902, and the control cycle may repeat.

Figure 10:
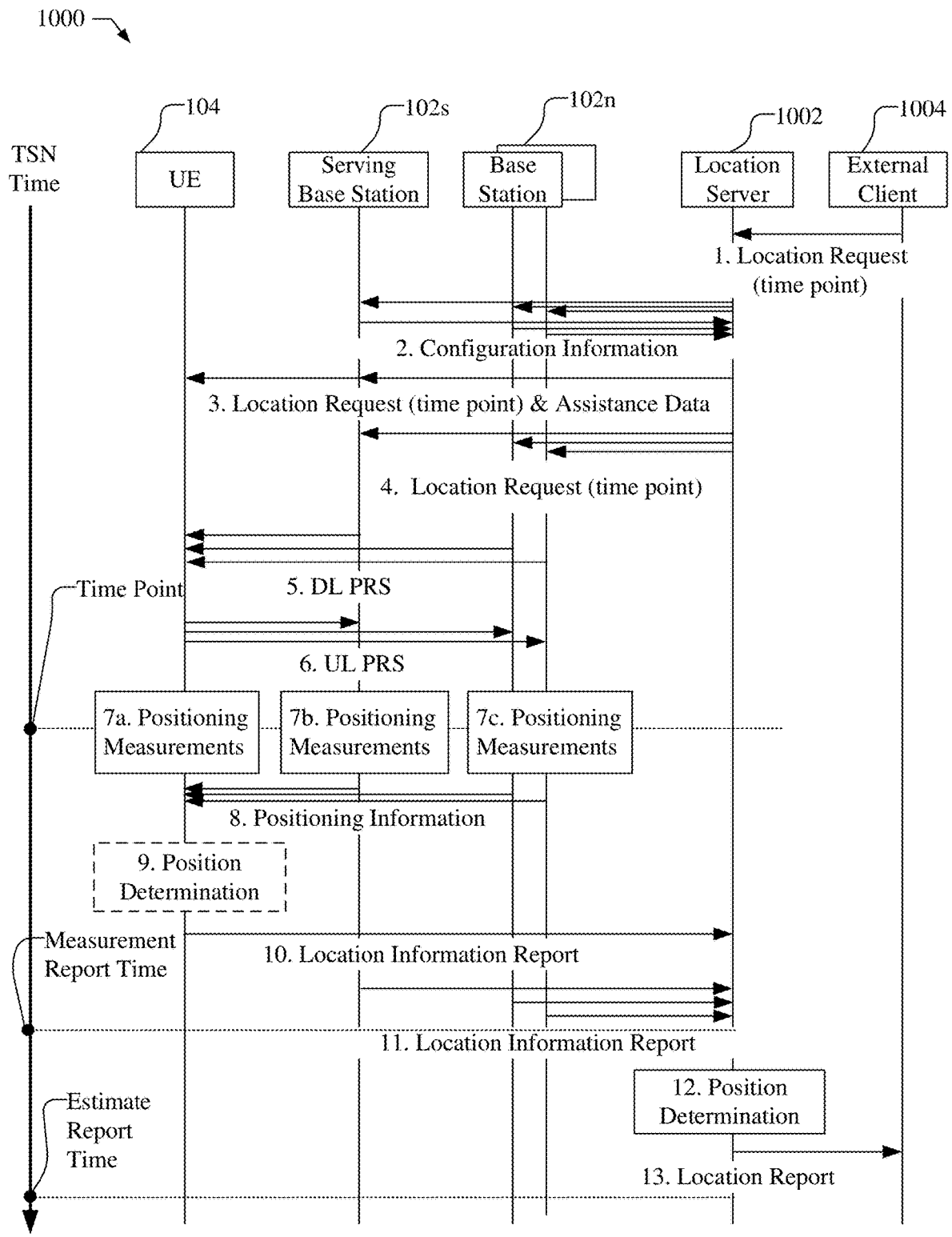
FIG. 10 is a message flow for a wireless network performing positioning within the TSN framework.

FIG. 10 is a message flow 1000 with various messages sent between entities in a wireless system, including a UE 104, a serving base station 102s, neighboring base stations 102n, a location server 1002, and an external client 1004, which may be, e.g., the motion controller 702. The serving base station 102s and neighboring base stations 102n are sometimes referred to as base stations 102. The message flow 1000 additionally illustrates a TSN timeline showing time points when particular actions are to occur. The UE 104 may be configured to perform UE assisted positioning or UE based positioning, in which the UE itself determines its location using, for example, assistance data provided to it, and may be configured to perform multi-cell RTT positioning. In the message flow 1000, it is assumed that the UE 104 and location server 1002 communicate using the LPP positioning protocol, although use of NPP or a combination of LPP and NPP or other future protocol, such as NRPPa, is also possible. It should be understood that preliminary or additional conventional stages not shown in FIG. 10 may be performed, such as capability requests and responses, requests for assistance data, etc.

At stage 1 the location server 1002 receives a location request message from the external client 1004 requesting one or more location estimates for the UE 104 at a time point within a TSN framework for performing positioning measurements. For example, the time point may be a global sampling point. The global sampling point may include a period and a phase within the period at which the positioning measurements are to be performed. For example, the period may be the TSN cycle and the phase may be a time instance within the period or TSN cycle. The location request may further include time points for location information and/or the position estimate. The location request may be for periodic positioning of the UE and may indicate, e.g., a sequence of time points within each period for obtaining positioning measurements as well as reporting location information and position estimates.

At stage 2, the location server 1002 requests configuration information and the base stations 102 provide configuration information.

At stage 3, location server 1002, via serving base station 102s, sends a location request message to the UE 104, e.g., requesting a location of the UE. The location request may be for periodic positioning of the UE and may indicate, e.g., a sequence of time points within each period for obtaining positioning measurements and reporting location information. In some implementations, location server 1002 may provide assistance data to the UE 104. In some implementations, the location request message may include a PRS transmission request message to request transmission of UL PRS, or the PRS transmission request message may be separate from the location request message. The PRS transmission request may be for periodic transmission of PRS and may indicate a time point within each period for transmitting the PRS. The location request message includes the time point within the TSN framework for performing positioning measurements based on received DL PRS and/or to transmit UL PRS. The location request may further include a time point for reporting positioning measurements.

At stage 4, the location server 1002 may send a location request message to the base stations 102, e.g., requesting a location of the UE. The location request may be for periodic positioning of the UE and may indicate, e.g., a sequence of time points within each period for obtaining positioning measurements and reporting location information. In some implementations, the location request message may include a PRS transmission request message to request transmission of DL PRS, or the PRS transmission request message may be separate from the location request message. The PRS transmission request may be for periodic transmission of PRS and may indicate a time point within each period for transmitting the PRS. The location request message includes the time point within the TSN framework for performing positioning measurements based on received UL PRS and/or to transmit DL PRS. The location request may further include a time point for reporting positioning measurements.

At stage 5, the base stations 102 may transmit DL PRS, e.g., if the location request in stage 4 instructed the base stations 102 to transmit DL PRS. The transmission of DL PRS may be aligned with the time point for positioning measurements as specified in the location request message of stage 4.

At stage 6, the UE 104 may transmit UL PRS, e.g., if the location request in stage 3 instructed the UE 104 to transmit UL PRS. The transmission of UL PRS may be aligned with the time point for positioning measurements as specified in the location request message of stage 3.

At stages 7a, the UE 104 performs positioning measurements using received DL PRS. The positioning measurements are performed at the time point for positioning measurements, which may be the global sampling point, as specified in the location request in stage 3, as illustrated on the TSN timeline. The UE 104 may perform positioning methods such as time of arrival (TOA), reference signal time difference (RSTD), time difference of arrival (TDOA), reference signal received power (RSRP), time difference between reception and transmission of signals (Rx-Tx), etc.

At stages 7b and 7c, the base stations 102 may perform positioning measurements using received UL PRS. The positioning measurements are performed at the time point for positioning measurements, which may be the global sampling point, as specified in the location request in stage 4, as illustrated on the TSN timeline. The base stations 102 may perform positioning methods such as time of arrival (TOA), reference signal received power (RSRP), time difference between reception and transmission of signals (Rx-Tx), etc.

At stage 8, the base stations 102 may send positioning information to the UE 104, such as the positioning measurements performed at stages 7b and 7c, the time of transmission of DL PRS and the time of arrival of the UL PRS, which may be used by the UE 104 for positioning methods such as Rx-Tx, RTT, and multi-RTT.

At stage 9, the UE 104 may optionally determine a position estimate using the positioning measurements performed at stage 7a and the positioning information received at stage 8, as well as positions of the base stations 102, which may be provided in the assistance data provided, e.g., at stage 3.

At stage 10, the UE 104 may transmit a location information report to the location server 1002. The location information report may provide the position measurements and/or position estimate, if determined, from stage 9 and may include time stamps for the position measurements. The location information report may be provided at or before a time point specified for the location information report in the location request in stage 3, as illustrated on the TSN timeline.

At stage 11, the base stations 102 may transmit a location information report to the location server 1002. The location information report may provide the position measurements and may include time stamps for the position measurements. The location information report may be provided at or before a time point specified for the location information report in the location request in stage 4, as illustrated on the TSN timeline.

At stage 12, the location server 1002 may determine a position estimate for the UE 104 based on positioning measurements received in the location information reports from stages 10 and 11, or may verify a position estimate for the UE if received in the location information report at stage 10.

At stage 13, the location server 1002 may provide a location report to the external client 1004 that includes the position estimate for the UE 104. The location report may include the time stamps for the positioning measurements. The location report may be provided at or before a time point specified for the location report in the location request in stage 1, as illustrated on the TSN timeline.

Figure 11:
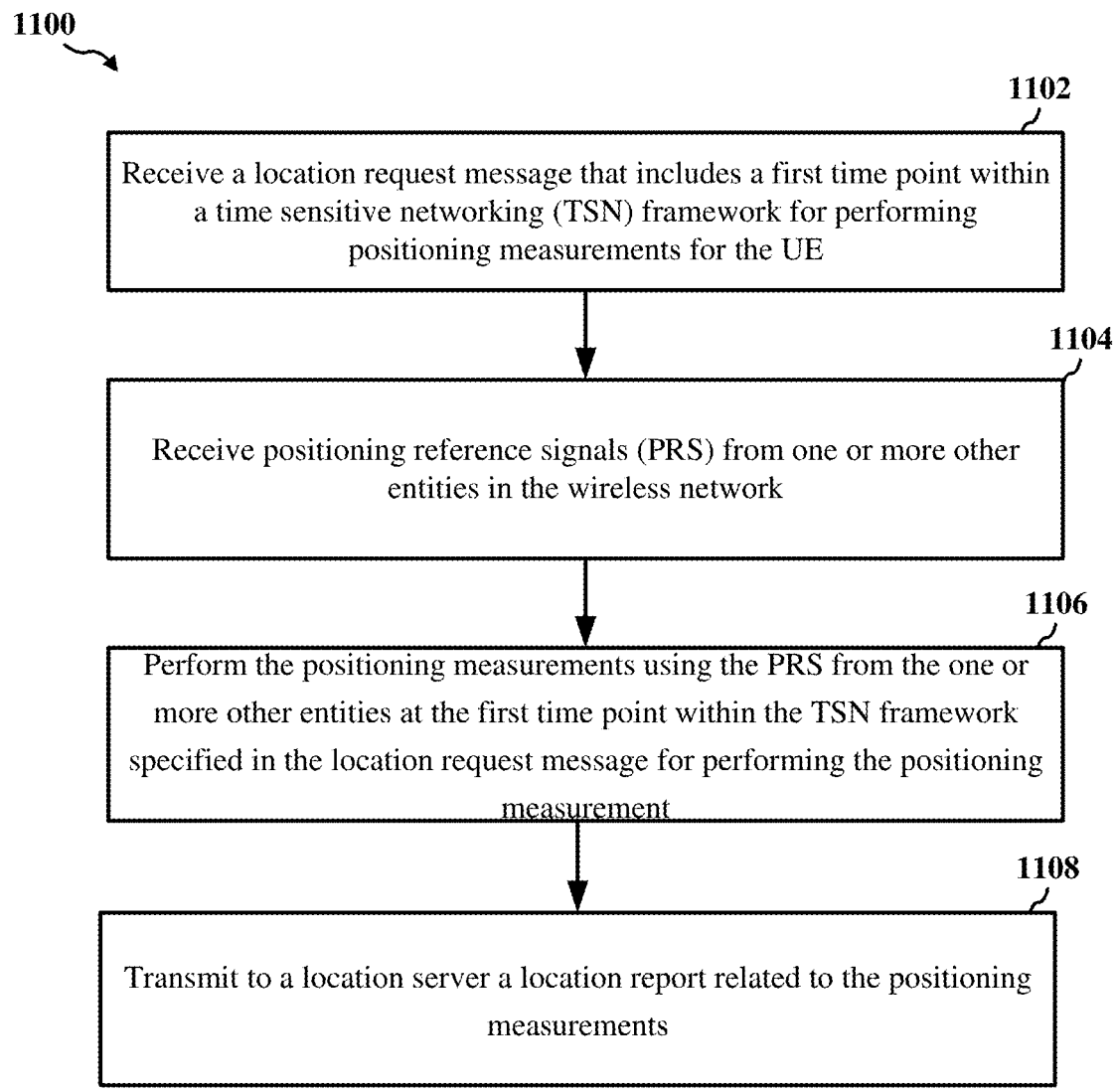
FIG. 11 is a flowchart for an exemplary method for performing positioning of a UE within the TSN framework performed by an entity in a wireless network.

FIG. 11 shows a flowchart for an exemplary method 1100 for performing positioning of a user equipment (UE) within a wireless network performed by an entity in the wireless network.

At block 1102, the entity receives a location request message that includes a first time point within a time sensitive networking (TSN) framework for performing positioning measurements for the UE, e.g., as discussed at stages 3 and 4 of FIG. 10. At block 1104, positioning reference signals (PRS) are received from one or more other entities in the wireless network, e.g., as discussed at stages 5 and 6 of FIG. 10. At block 1106, positioning measurements are performed using the PRS from the one or more other entities at the first time point within the TSN framework specified in the location request message for performing the positioning measurement, e.g., as discussed at stages 7a, 7b, and 7c of FIG. 10. At block 1108, a location information report related to the positioning measurements is transmitted to a location server, e.g., as discussed at stages 10 and 11 of FIG. 10.

In one implementation, the location request message may further include a second time point for providing a location information report, wherein the location information report is transmitted to the location server at or before the second time point, e.g., as discussed at stages 3, 4, 10 and 11 of FIG. 10.

In one implementation, the entity in the wireless network may be the UE and the PRS are downlink PRS, e.g., as discussed at stages 5 and 7a of FIG. 10.

In one implementation, the entity in the wireless network may be a base station and the PRS are uplink PRS, e.g., as discussed at stages 6 and 7b and 7c of FIG. 10.

In one implementation, the wireless network and the TSN framework may be synchronized in time, e.g., as discussed in FIGS. 9 and 10.

In one implementation, the first time point within the TSN framework specified in the location request message for performing the positioning measurement may be a global sampling point, e.g., as discussed at stages 1, 7a, 7b, and 7c of FIG. 10. The global sampling point may be a period and a phase. For example, the period may be a TSN cycle and the phase may be a time instant within the period, e.g., as discussed at stages 1, 7a, 7b, and 7c of FIG. 10.

In one implementation, the entity may be the UE and the one or more other entities may be one or more base stations, and the UE may determine a position estimate for the UE based on the positioning measurements, and the location information report related to the positioning measurements may include the position estimate for the UE, e.g., as discussed at stages 9 and 10 of FIG. 10. The UE may further receive positioning measurements from the one or more other entities, wherein the position estimate for the UE is determined further based on the positioning measurements received from the one or more other entities, e.g., as discussed at stages 8 and 9 of FIG. 10.

In one implementation, the location information report related to the positioning measurements may be the positioning measurements, e.g., as discussed at stage 10 of FIG. 10.

In one implementation, the entity may further receive a request to transmit PRS that includes the first time point within the TSN framework for transmitting the PRS, and may transmit PRS to one or more other entities at the first time point within the TSN framework specified in the location request message for transmitting UL PRS, e.g., as discussed at stages 3 and 5 or stages 4 and 6 of FIG. 10.

In one implementation, the location information report related to the positioning measurements may include a time stamp for the positioning measurements, e.g., as discussed at stages 10 and 11 of FIG. 10.

In one implementation, the UE is a sensor in a motion control system using the TSN framework, e.g., as discussed in FIGS. 7 and 10.

Figure 12:
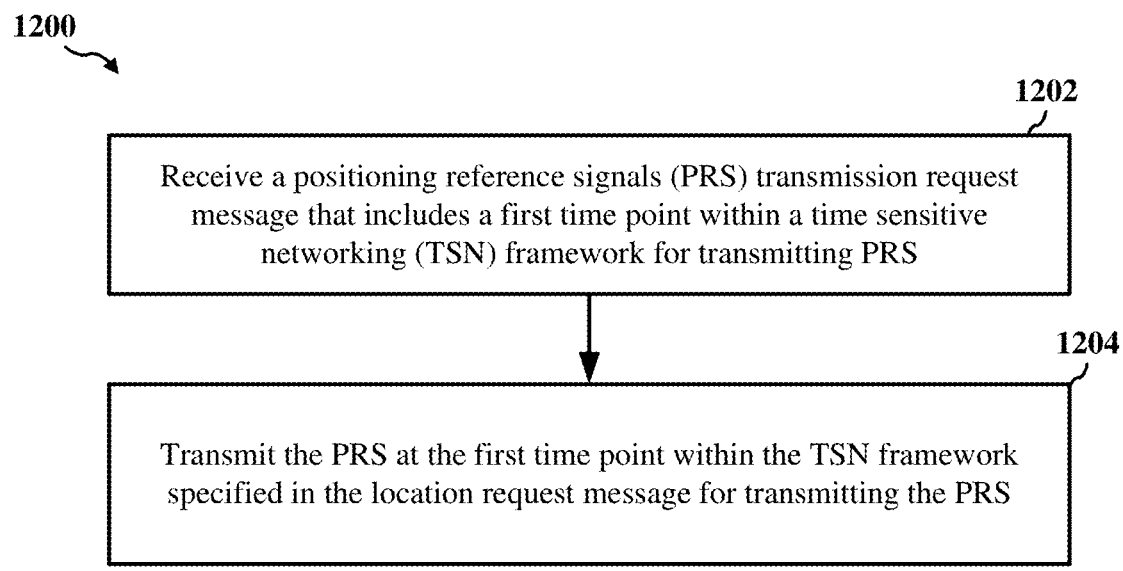
FIG. 12 is a flowchart for an exemplary method for performing positioning of a UE within the TSN framework performed by an entity in a wireless network.

FIG. 12 shows a flowchart for an exemplary method 1200 for performing positioning of a user equipment (UE) within a wireless network performed by an entity in the wireless network.

At block 1202, the entity receives a positioning reference signals (PRS) transmission request message that includes a first time point within a time sensitive networking (TSN) framework for transmitting PRS, e.g., as discussed at stages 3 and 4 of FIG. 10. At block 1204, the PRS is transmitted at the first time point within the TSN framework specified in the location request message for transmitting the PRS, e.g., as discussed at stages 5 and 6 of FIG. 10.

In one implementation, the entity in the wireless network may be the UE and the PRS are uplink PRS, e.g., as discussed at stage 6 of FIG. 10.

In one implementation, the entity in the wireless network may be a base station and the PRS are downlink PRS, e.g., as discussed at stage 6 of FIG. 10.

In one implementation, the wireless network and the TSN framework are synchronized in time, e.g., as discussed in FIGS. 9 and 10.

In one implementation, the first time point within the TSN framework specified in the location request message for transmitting the PRS comprises a global sampling point, e.g., as discussed at stages 1, 7a, 7b, and 7c of FIG. 10. The global sampling point may be a period and a phase. For example, the period may be a TSN cycle and the phase may be a time instant within the period, e.g., as discussed at stages 1, 7a, 7b, and 7c of FIG. 10.

In one implementation, the UE may be a sensor in a motion control system, e.g., as discussed in FIGS. 7 and 10.

Figure 13:
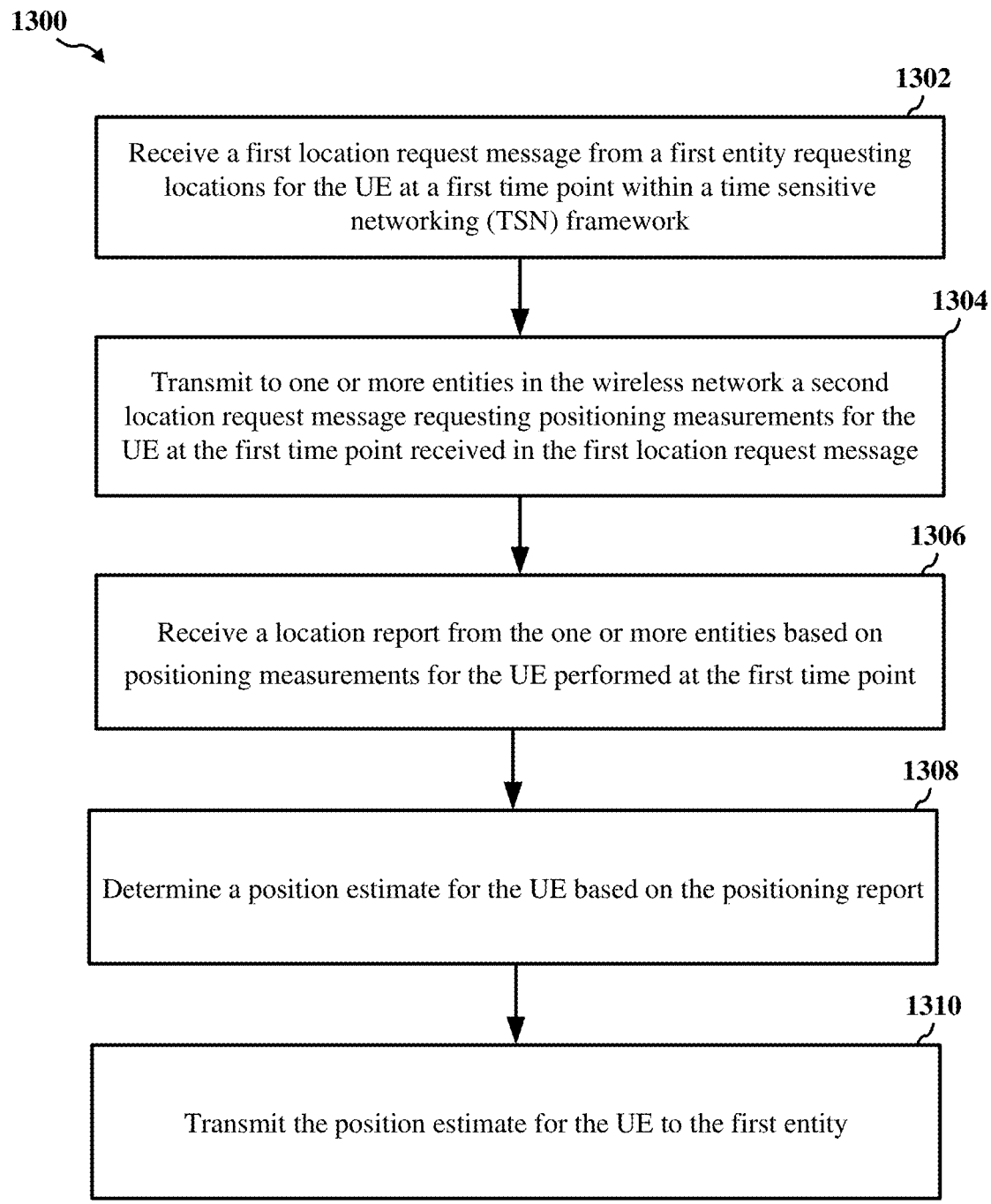
FIG. 13 is a flowchart for an exemplary method for performing positioning of a UE within the TSN framework performed by a location server in a wireless network.

FIG. 13 shows a flowchart for an exemplary method 1300 performing positioning of a user equipment (UE) within a wireless network performed by a location server in the wireless network.

At block 1302, the location server receives 418 a first location request message from a first entity requesting locations for the UE at a first time point within a time sensitive networking (TSN) framework, e.g., as discussed at stage 1 of FIG. 10. At block 1304, a second location request message is transmitted to one or more entities in the wireless network requesting positioning measurements for the UE at the first time point received in the first location request message, e.g., as discussed at stages 3 and 4 of FIG. 10. At block 1306, a location information report is received from the one or more entities based on positioning measurements for the UE performed at the first time point, e.g., as discussed at stages 10 and 11 of FIG. 10. At block 1308, a position estimate for the UE is determined based on the positioning report, e.g., as discussed at stage 12 of FIG. 10. At block 1310, the position estimate for the UE is transmitted to the first entity, e.g., as discussed at stage 13 of FIG. 10.

In one implementation, the first location request message may further include a second time point for providing the position estimate, wherein the position estimate is transmitted to the first entity at or before the second time point, e.g., as discussed at stage 1 and 13 of FIG. 10.

In one implementation, the wireless network and the TSN framework are synchronized in time, e.g., as discussed in FIGS. 9 and 10.

In one implementation, the first time point within the TSN framework may be a global sampling point, e.g., as discussed at stages 1, 7a, 7b, and 7c of FIG. 10. The global sampling point may be a period and a phase. For example, the period may be a TSN cycle and the phase may be a time instant within the period, e.g., as discussed at stages 1, 7a, 7b, and 7c of FIG. 10.

In one implementation, the location information report based on positioning measurements for the UE may include one of positioning measurements performed by the UE based on downlink (DL) positioning reference signals (PRS) received by the UE, positioning measurements performed by a base station based on uplink (UL) PRS transmitted by the UE, or a combination thereof, and determining the position estimate for the UE may include generating the position estimate using the positioning measurements for the UE received in the positioning report, e.g., as discussed at stages 10, 11, and 12 of FIG. 10.

In one implementation, the location information report based on positioning measurements for the UE may be the position estimate for the UE that is determined by the UE, e.g., as discussed at stages 9 and 10 of FIG. 10.

In one implementation, the location information report based on the positioning measurements for the UE may include a time stamp for the positioning measurements, and wherein the position estimate for the UE includes the time stamp for the positioning measurements, e.g., as discussed at stages 10, 11, and 13 of FIG. 10.

In one implementation, the UE and location server are a sensor and the first entity is a motion controller in a motion control system using the TSN framework, e.g., as discussed in FIG. 10.

Figure 14:
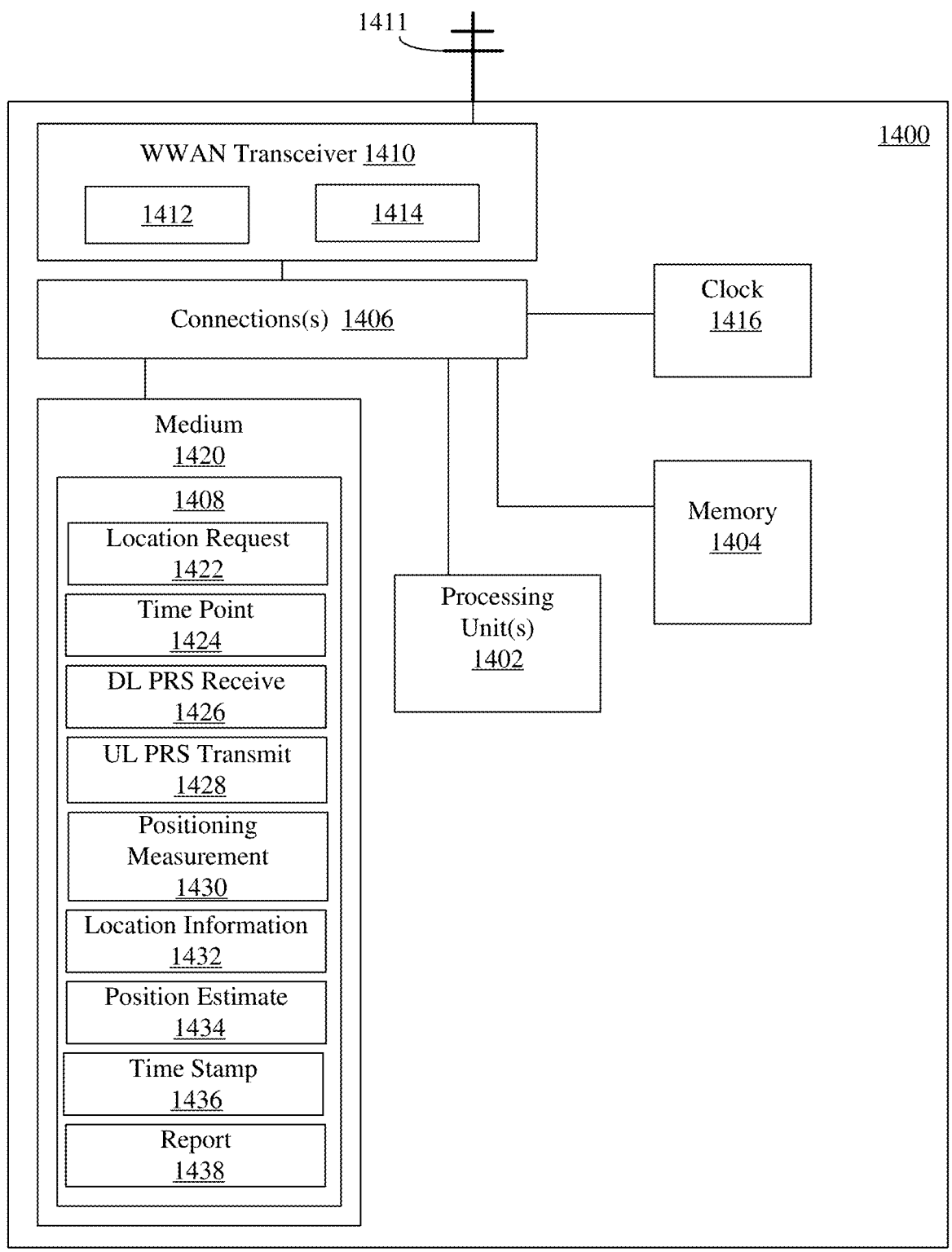
FIG. 14 shows a schematic block diagram illustrating certain exemplary features of a UE enabled to perform positioning within the TSN framework. [in general, for UE apparatus diagrams, we should also include WLAN transceiver and other short range transceiver such as Bluetooth, etc. We may also need to include SPS receiver, etc. We may not want to change this now but keep this in mind for future cases]

FIG. 14 shows a schematic block diagram illustrating certain exemplary features of a UE 1400, e.g., which may be UE 104 shown in FIG. 1, that is configured to perform positioning within a wireless network, e.g., in a TSN framework, as described herein. The UE 1400, in one example, may be a sensor in a motion control system using the TSN framework. The UE 1400 may, for example, include one or more processors 1402, memory 1404, an external interface such as a at least one wireless transceiver 1410 (e.g., wireless network interface), which may be operatively coupled with one or more connections 1406 (e.g., buses, lines, fibers, links, etc.) to non-transitory computer readable medium 1420 and memory 1404. The UE 1400 may further include a clock 1416 that may be synchronized in time with the TSN clock. The UE 1400 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1400 may take the form of a chipset, and/or the like. Wireless transceiver 1410 may, for example, include a transmitter 1412 enabled to transmit one or more signals over one or more types of wireless communication networks and a receiver 1414 to receive one or more signals transmitted over the one or more types of wireless communication networks.

In some embodiments, UE 1400 may include antenna 1411, which may be internal or external. UE antenna 1411 may be used to transmit and/or receive signals processed by wireless transceiver 1410. In some embodiments, UE antenna 1411 may be coupled to wireless transceiver 1410. In some embodiments, measurements of signals received (transmitted) by UE 1400 may be performed at the point of connection of the UE antenna 1411 and wireless transceiver 1410. For example, the measurement point of reference for received (transmitted) RF signal measurements may be an input (output) terminal of the receiver 1414 (transmitter 1412) and an output (input) terminal of the UE antenna 1411. In a UE 1400 with multiple UE antennas 1411 or antenna arrays, the antenna connector may be viewed as a virtual point representing the aggregate output (input) of multiple UE antennas. In some embodiments, UE 1400 may measure received signals including signal strength and TOA measurements and the raw measurements may be processed by the one or more processors 1402.

The one or more processors 1402 may be implemented using a combination of hardware, firmware, and software. For example, the one or more processors 1402 may be configured to perform the functions discussed herein by implementing one or more instructions or program code 1408 on a non-transitory computer readable medium, such as medium 1420 and/or memory 1404. In some embodiments, the one or more processors 1402 may represent one or more circuits configurable to perform at least a portion of a data signal computing procedure or process related to the operation of UE 1400.

The medium 1420 and/or memory 1404 may store instructions or program code 1408 that contain executable code or software instructions that when executed by the one or more processors 1402 cause the one or more processors 1402 to operate as a special purpose computer programmed to perform the techniques disclosed herein. As illustrated in UE 1400, the medium 1420 and/or memory 1404 may include one or more components or modules that may be implemented by the one or more processors 1402 to perform the methodologies described herein. While the components or modules are illustrated as software in medium 1420 that is executable by the one or more processors 1402, it should be understood that the components or modules may be stored in memory 1404 or may be dedicated hardware either in the one or more processors 1402 or off the processors.

A number of software modules and data tables may reside in the medium 1420 and/or memory 1404 and be utilized by the one or more processors 1402 in order to manage both communications and the functionality described herein. It should be appreciated that the organization of the contents of the medium 1420 and/or memory 1404 as shown in UE 1400 is merely exemplary, and as such the functionality of the modules and/or data structures may be combined, separated, and/or be structured in different ways depending upon the implementation of the UE 1400.

The medium 1420 and/or memory 1404 may include a location request module 1422 that when implemented by the one or more processors 1402 configures the one or more processors 1402 to receive from a location server, e.g., via wireless transceiver 1410, a location request message that includes a first time point within a time sensitive networking (TSN) framework for performing positioning measurements for the UE. The location request message may additionally or alternatively request transmission of UL PRS at the first time point within the TSN framework. The location request message may include additional time points, for example, for providing a location report to a location server. The time point may be a global sampling point. The global sampling point may include a period and a phase within the period at which the positioning measurements are to be performed. For example, the period may be the TSN cycle and the phase may be a time instance within the period or TSN cycle.

The medium 1420 and/or memory 1404 may include a time point module 1424 that when implemented by the one or more processors 1402 configures the one or more processors 1402 to monitor clock 1416 to perform specific actions, such as positioning measurements and location reporting, at requested time points in the TSN framework.

The medium 1420 and/or memory 1404 may include a DL PRS receive module 1426 that when implemented by the one or more processors 1402 configures the one or more processors 1402 to receive, via the wireless transceiver 1410, DL PRS transmitted by one or more base stations.

The medium 1420 and/or memory 1404 may include a UL PRS transmit module 1428 that when implemented by the one or more processors 1402 configures the one or more processors 1402 to transmit, via the wireless transceiver 1410, multiple UL PRS, e.g., SRS for positioning. The one or more processors 1402 may be configured to transmit the UL PRS at the requested time point within the TSN framework.

The medium 1420 and/or memory 1404 may include a positioning measurement module 1430 that when implemented by the one or more processors 1402 configures the one or more processors 1402 to perform positioning measurements using received DL PRS and/or UL PRS at the requested time point within the TSN framework. For example, the positioning measurements may be, e.g., TOA, RSTD, OTDOA, Rx-Tx, RSRP, RTT, multi-RTT, AoA, or AoD.

The medium 1420 and/or memory 1404 may include a location information module 1432 that when implemented by the one or more processors 1402 configures the one or more processors 1402 to receive, via the wireless transceiver 1410, location information from one or more base stations. The location information, for example, may include positioning measurements including the time of transmission of transmitted DL PRS and the time of arrival of received UL PRS.

The medium 1420 and/or memory 1404 may include a position estimate module 1434 that when implemented by the one or more processors 1402 configures the one or more processors 1402 to estimate a position of the UE 1400 in a UE based positioning process using the position measurements performed by the UE 1400 and location information provided by base stations, along with the locations of the base stations, e.g., received in assistance data, which may be received with the location request message or in a separate assistance data provide message.

The medium 1420 and/or memory 1404 may include a time stamp module 1436 that when implemented by the one or more processors 1402 configures the one or more processors 1402 to associate a positioning measurement with the time that the positioning measurement was performed using a time stamp.

The medium 1420 and/or memory 1404 may include a reporting module 1438 that when implemented by the one or more processors 1402 configures the one or more processors 1402 to transmit to a location server, via the wireless transceiver 1410, a location report related to the positioning measurements, which may be the positioning measurements and/or position estimate, and a time stamp.

The methodologies described herein may be implemented by various means depending upon the application. For example, these methodologies may be implemented in hardware, firmware, software, or any combination thereof. For a hardware implementation, the one or more processors 1402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1420 or memory 1404 that is connected to and executed by the one or more processors 1402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1408 on a non-transitory computer readable medium, such as medium 1420 and/or memory 1404. Examples include computer readable media encoded with a data structure and computer readable media encoded with a computer program 1408. For example, the non-transitory computer readable medium including program code 1408 stored thereon may include program code 1408 to support positioning of a UE in a TSN framework in a manner consistent with disclosed embodiments. Non-transitory computer readable medium 1420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1408 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1420, instructions and/or data may be provided as signals on transmission media included in a communication apparatus. For example, a communication apparatus may include a wireless transceiver 1410 having signals indicative of instructions and data. The instructions and data are configured to cause one or more processors to implement the functions outlined in the claims. That is, the communication apparatus includes transmission media with signals indicative of information to perform disclosed functions.

Memory 1404 may represent any data storage mechanism. Memory 1404 may include, for example, a primary memory and/or a secondary memory. Primary memory may include, for example, a random access memory, read only memory, etc. While illustrated in this example as being separate from one or more processors 1402, it should be understood that all or part of a primary memory may be provided within or otherwise co-located/coupled with the one or more processors 1402. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1420. As such, in certain example implementations, the methods and/or apparatuses presented herein may take the form in whole or part of a computer readable medium 1420 that may include computer implementable code 1408 stored thereon, which if executed by one or more processors 1402 may be operatively enabled to perform all or portions of the example operations as described herein. Computer readable medium 1420 may be a part of memory 1404.

An entity in a wireless network, such as UE 1400, may be configured to perform positioning of a user equipment (UE) within the wireless network and may include a means for receiving a location request message that includes a first time point within a time sensitive networking (TSN) framework for performing positioning measurements for the UE, which may be, e.g., the wireless transceiver 1410 and one or more processors 1402 with dedicated hardware or implementing executable code or software instructions in memory 1404 and/or medium 1420 such as the location request module 1422. A means for receiving positioning reference signals (PRS) from one or more other entities in the wireless network may be, e.g., the wireless transceiver 1410 and one or more processors 1402 with dedicated hardware or implementing executable code or software instructions in memory 1404 and/or medium 1420 such as the DL PRS receive module 1426. A means for performing positioning measurements using the PRS from the one or more other entities at the first time point within the TSN framework specified in the location request message for performing the positioning measurements may be, e.g., the one or more processors 1402 with dedicated hardware or implementing executable code or software instructions in memory 1404 and/or medium 1420 such as the time point module 1424 and the positioning measurement module 1430. A means for transmitting to a location server a location information report related to the positioning measurements may be, e.g., the wireless transceiver 1410 and one or more processors 1402 with dedicated hardware or implementing executable code or software instructions in memory 1404 and/or medium 1420 such as the report module 1428.

In some implementations, the entity may further include a means for determining a position estimate for the UE based on the positioning measurements, which may be, e.g., the one or more processors 1402 with dedicated hardware or implementing executable code or software instructions in memory 1404 and/or medium 1420 such as the position estimate 1434, wherein the location information report related to the positioning measurements comprises the position estimate for the UE. In one example, the entity may further include a means for receiving positioning measurements from the one or more other entities, which may be, e.g., the wireless transceiver 1410 and one or more processors 1402 with dedicated hardware or implementing executable code or software instructions in memory 1404 and/or medium 1420 such as the location information module 1432, wherein the position estimate for the UE is further determined based on the positioning measurements received from the one or more other entities.

In some implementations, the entity may further include a means for receiving a request to transmit PRS that includes the first time point within the TSN framework for transmitting the PRS, which may be, e.g., the wireless transceiver 1410 and one or more processors 1402 with dedicated hardware or implementing executable code or software instructions in memory 1404 and/or medium 1420 such as the location request module 1422. A means for transmitting PRS to the one or more other entities at the first time point within the TSN framework specified in the location request message for transmitting UL PRS may be, e.g., the wireless transceiver 1410 and one or more processors 1402 with dedicated hardware or implementing executable code or software instructions in memory 1404 and/or medium 1420 such as the UL PRS transmit module 1428.

An entity in a wireless network, such as UE 1400, may be configured to perform positioning of a user equipment (UE) within the wireless network and may include a means for receiving a positioning reference signals (PRS) transmission request message that includes a first time point within a time sensitive networking (TSN) framework for transmitting PRS, which may be, e.g., the wireless transceiver 1410 and one or more processors 1402 with dedicated hardware or implementing executable code or software instructions in memory 1404 and/or medium 1420 such as the location request module 1422. A means for transmitting the PRS at the first time point within the TSN framework specified in the PRS transmission request message for transmitting the PRS may be, e.g., the wireless transceiver 1410 and one or more processors 1402 with dedicated hardware or implementing executable code or software instructions in memory 1404 and/or medium 1420 such as the UL PRS transmit module 1428.

Figure 15:
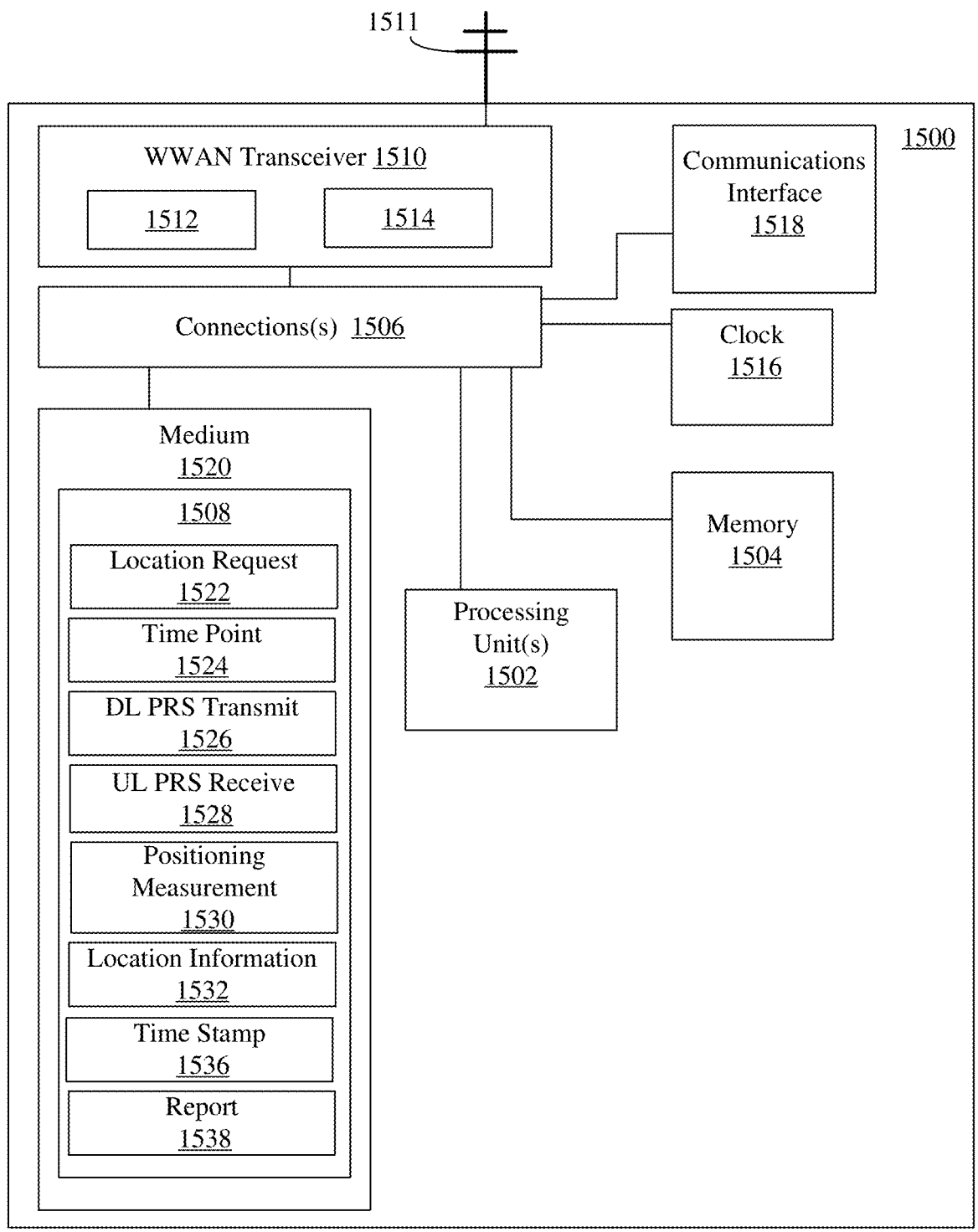
FIG. 15 shows a schematic block diagram illustrating certain exemplary features of a base station in a wireless network enabled to perform positioning within the TSN framework.

FIG. 15 shows a schematic block diagram illustrating certain exemplary features of a base station 1500, e.g., which may be base station 102 shown in FIG. 1, that is configured to perform positioning for a UE within a wireless network, e.g., in a TSN framework, as described herein. The UE, in one example, may be a sensor in a motion control system using the TSN framework. The base station 1500 may, for example, include one or more processors 1502, memory 1504, an external interface such as a at least one wireless transceiver 1510 (e.g., wireless network interface) and communications interface 1518 (e.g., wireline or wireless network interface to other base stations and/or the core network and a location server), which may be operatively coupled with one or more connections 1506 (e.g., buses, lines, fibers, links, etc.) to non-transitory computer readable medium 1520 and memory 1504. The base station 1500 may further include a clock 1516 that may be synchronized in time with the TSN clock. In certain example implementations, all or part of base station 1500 may take the form of a chipset, and/or the like. Wireless transceiver 1510 may, for example, include a transmitter 1512 enabled to transmit one or more signals over one or more types of wireless communication networks and a receiver 1514 to receive one or more signals transmitted over the one or more types of wireless communication networks.

In some embodiments, base station 1500 may include antenna 1511, which may be internal or external. Antenna 1511 may be used to transmit and/or receive signals processed by wireless transceiver 1510. In some embodiments, antenna 1511 may be coupled to wireless transceiver 1510. In some embodiments, measurements of signals received (transmitted) by base station 1500 may be performed at the point of connection of the antenna 1511 and wireless transceiver 1510. For example, the measurement point of reference for received (transmitted) RF signal measurements may be an input (output) terminal of the receiver 1514 (transmitter 1512) and an output (input) terminal of the antenna 1511. In a base station 1500 with multiple antennas 1511 or antenna arrays, the antenna connector may be viewed as a virtual point representing the aggregate output (input) of multiple UE antennas. In some embodiments, base station 1500 may measure received signals including signal strength and TOA measurements and the raw measurements may be processed by the one or more processors 1502.

The one or more processors 1502 may be implemented using a combination of hardware, firmware, and software. For example, the one or more processors 1502 may be configured to perform the functions discussed herein by implementing one or more instructions or program code 1508 on a non-transitory computer readable medium, such as medium 1520 and/or memory 1504. In some embodiments, the one or more processors 1502 may represent one or more circuits configurable to perform at least a portion of a data signal computing procedure or process related to the operation of base station 1500.

The medium 1520 and/or memory 1504 may store instructions or program code 1508 that contain executable code or software instructions that when executed by the one or more processors 1502 cause the one or more processors 1502 to operate as a special purpose computer programmed to perform the techniques disclosed herein. As illustrated in base station 1500, the medium 1520 and/or memory 1504 may include one or more components or modules that may be implemented by the one or more processors 1502 to perform the methodologies described herein. While the components or modules are illustrated as software in medium 1520 that is executable by the one or more processors 1502, it should be understood that the components or modules may be stored in memory 1504 or may be dedicated hardware either in the one or more processors 1502 or off the processors.

A number of software modules and data tables may reside in the medium 1520 and/or memory 1504 and be utilized by the one or more processors 1502 in order to manage both communications and the functionality described herein. It should be appreciated that the organization of the contents of the medium 1520 and/or memory 1504 as shown in base station 1500 is merely exemplary, and as such the functionality of the modules and/or data structures may be combined, separated, and/or be structured in different ways depending upon the implementation of the base station 1500.

The medium 1520 and/or memory 1504 may include a location request module 1522 that when implemented by the one or more processors 1502 configures the one or more processors 1502 to receive from a location server, e.g., via the communications interface 1518, a location request message that includes a first time point within a time sensitive networking (TSN) framework for performing positioning measurements for the UE. The location request message may additionally or alternatively request transmission of DL PRS at the first time point within the TSN framework. The location request message may include additional time points, for example, for providing a location report to a location server. The time point may be a global sampling point. The global sampling point may include a period and a phase within the period at which the positioning measurements are to be performed. For example, the period may be the TSN cycle and the phase may be a time instance within the period or TSN cycle.

The medium 1520 and/or memory 1504 may include a time point module 1524 that when implemented by the one or more processors 1502 configures the one or more processors 1502 to monitor clock 1516 to perform specific actions, such as positioning measurements and location reporting, at requested time points in the TSN framework.

The medium 1520 and/or memory 1504 may include a DL PRS transmit module 1526 that when implemented by the one or more processors 1502 configures the one or more processors 1502 to transmit DL PRS, via the wireless transceiver 1510. The one or more processors 1502 may be configured to transmit the DL PRS at the requested time point within the TSN framework.

The medium 1520 and/or memory 1504 may include a UL PRS receive module 1528 that when implemented by the one or more processors 1502 configures the one or more processors 1502 to receive, via the wireless transceiver 1510, UL PRS, e.g., SRS for positioning, from the UE.

The medium 1520 and/or memory 1504 may include a positioning measurement module 1530 that when implemented by the one or more processors 1502 configures the one or more processors 1502 to perform positioning measurements using received UL PRS and/or DL PRS at the requested time point within the TSN framework. For example, the positioning measurements may be, e.g., TOA, RSTD, OTDOA, Rx-Tx, RSRP, RTT, multi-RTT, AoA, or AoD.

The medium 1520 and/or memory 1504 may include a location information module 1532 that when implemented by the one or more processors 1502 configures the one or more processors 1502 to transmit, via the wireless transceiver 1510, location information to the UE. The location information, for example, may include positioning measurements including the time of transmission of transmitted DL PRS and the time of arrival of received UL PRS.

The medium 1520 and/or memory 1504 may include a time stamp module 1536 that when implemented by the one or more processors 1502 configures the one or more processors 1502 to associate a positioning measurement with the time that the positioning measurement was performed using a time stamp.

The medium 1520 and/or memory 1504 may include a reporting module 1538 that when implemented by the one or more processors 1502 configures the one or more processors 1502 to transmit to a location server, via the communications interface 1518, a location report related to the positioning measurements, which may be the positioning measurements and a time stamp.

The methodologies described herein may be implemented by various means depending upon the application. For example, these methodologies may be implemented in hardware, firmware, software, or any combination thereof. For a hardware implementation, the one or more processors 1502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1520 or memory 1504 that is connected to and executed by the one or more processors 1502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1508 on a non-transitory computer readable medium, such as medium 1520 and/or memory 1504. Examples include computer readable media encoded with a data structure and computer readable media encoded with a computer program 1508. For example, the non-transitory computer readable medium including program code 1508 stored thereon may include program code 1508 to support positioning of a UE in a TSN framework in a manner consistent with disclosed embodiments. Non-transitory computer readable medium 1520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1508 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1520, instructions and/or data may be provided as signals on transmission media included in a communication apparatus. For example, a communication apparatus may include a wireless transceiver 1510 having signals indicative of instructions and data. The instructions and data are configured to cause one or more processors to implement the functions outlined in the claims. That is, the communication apparatus includes transmission media with signals indicative of information to perform disclosed functions.

Memory 1504 may represent any data storage mechanism. Memory 1504 may include, for example, a primary memory and/or a secondary memory. Primary memory may include, for example, a random access memory, read only memory, etc. While illustrated in this example as being separate from one or more processors 1502, it should be understood that all or part of a primary memory may be provided within or otherwise co-located/coupled with the one or more processors 1502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1520. As such, in certain example implementations, the methods and/or apparatuses presented herein may take the form in whole or part of a computer readable medium 1520 that may include computer implementable code 1508 stored thereon, which if executed by one or more processors 1502 may be operatively enabled to perform all or portions of the example operations as described herein. Computer readable medium 1520 may be a part of memory 1504.

An entity in a wireless network, such as base station 1500, may be configured to perform positioning of a user equipment (UE) within the wireless network and may include a means for receiving a location request message that includes a first time point within a time sensitive networking (TSN) framework for performing positioning measurements for the UE, which may be, e.g., the communications interface 1518 and one or more processors 1502 with dedicated hardware or implementing executable code or software instructions in memory 1504 and/or medium 1520 such as the location request module 1522. A means for receiving positioning reference signals (PRS) from one or more other entities in the wireless network may be, e.g., the wireless transceiver 1510 and one or more processors 1502 with dedicated hardware or implementing executable code or software instructions in memory 1504 and/or medium 1520 such as the UL PRS receive module 1528. A means for performing positioning measurements using the PRS from the one or more other entities at the first time point within the TSN framework specified in the location request message for performing the positioning measurements may be, e.g., the one or more processors 1502 with dedicated hardware or implementing executable code or software instructions in memory 1504 and/or medium 1520 such as the time point module 1524 and the positioning measurement module 1530. A means for transmitting to a location server a location information report related to the positioning measurements may be, e.g., the communications interface 1518 and one or more processors 1502 with dedicated hardware or implementing executable code or software instructions in memory 1504 and/or medium 1520 such as the report module 1538.

In some implementations, the entity may further include a means for receiving a request to transmit PRS that includes the first time point within the TSN framework for transmitting the PRS, which may be, e.g., the communications interface 1518 and one or more processors 1502 with dedicated hardware or implementing executable code or software instructions in memory 1504 and/or medium 1520 such as the location request module 1522. A means for transmitting PRS to the one or more other entities at the first time point within the TSN framework specified in the location request message for transmitting UL PRS may be, e.g., the wireless transceiver 1510 and one or more processors 1502 with dedicated hardware or implementing executable code or software instructions in memory 1504 and/or medium 1520 such as the DL PRS transmit module 1526.

An entity in a wireless network, such as base station 1500, may be configured to perform positioning of a user equipment (UE) within the wireless network and may include a means for receiving a positioning reference signals (PRS) transmission request message that includes a first time point within a time sensitive networking (TSN) framework for transmitting PRS, which may be, e.g., the communications interface 1518 and one or more processors 1502 with dedicated hardware or implementing executable code or software instructions in memory 1504 and/or medium 1520 such as the location request module 1522. A means for transmitting the PRS at the first time point within the TSN framework specified in the PRS transmission request message for transmitting the PRS may be, e.g., the wireless transceiver 1510 and one or more processors 1502 with dedicated hardware or implementing executable code or software instructions in memory 1504 and/or medium 1520 such as the DL PRS transmit module 1526.

Figure 16:
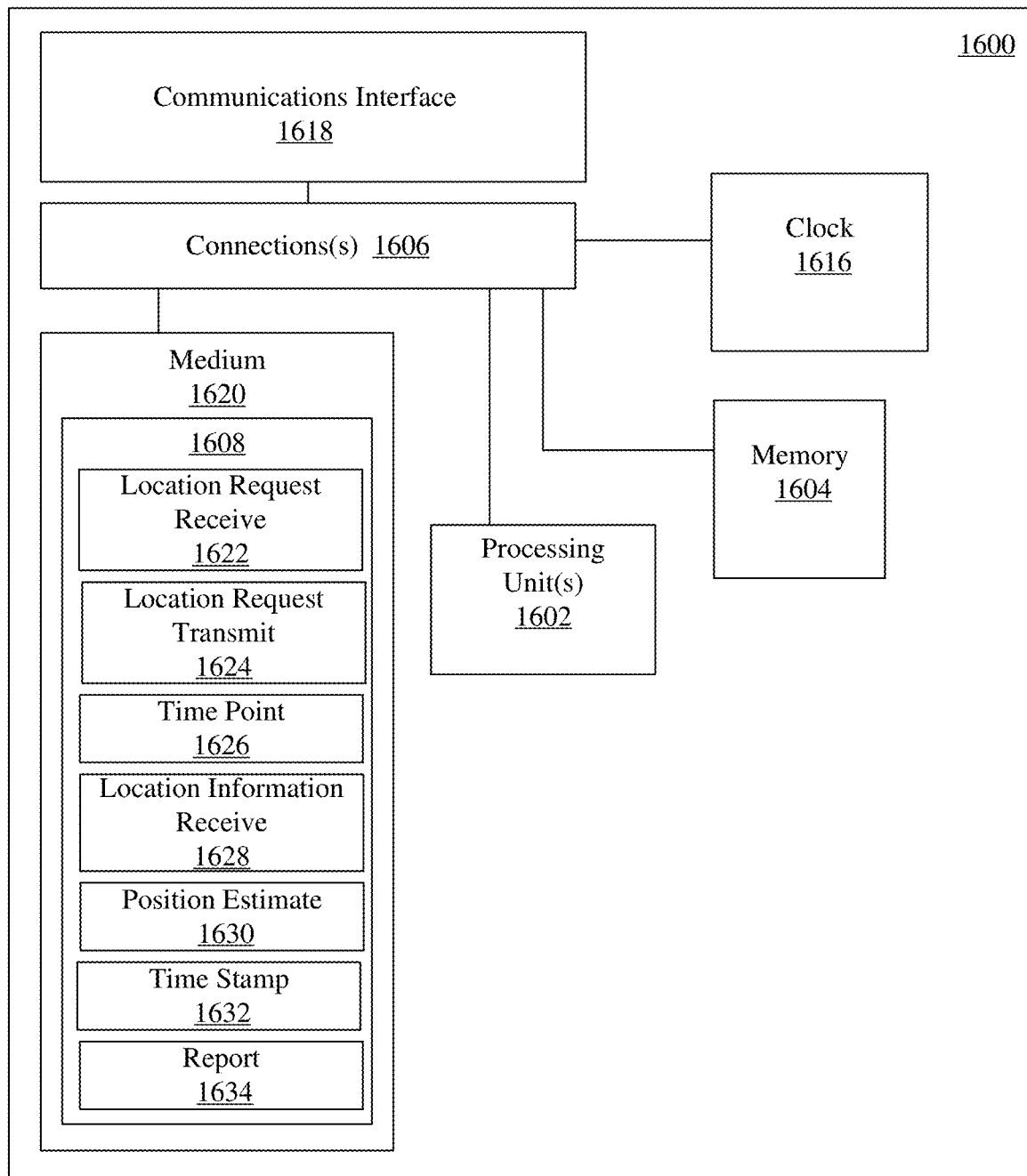
FIG. 16 shows a schematic block diagram illustrating certain exemplary features of a location server in a wireless network enabled to perform positioning within the TSN framework.

FIG. 16 shows a schematic block diagram illustrating certain exemplary features of a location server 1600, e.g., LMF 196 in FIG. 1, that is configured to perform positioning for a UE within a wireless network, e.g., in a TSN framework, as described herein. The UE, in one example, may be a sensor in a motion control system using the TSN framework. Location server 1600 may, for example, include one or more processors 1602, memory 1604, an external interface, which may include a communications interface 1618 (e.g., wireline or wireless network interface to base stations and/or entities in the core network), which may be operatively coupled with one or more connections 1606 (e.g., buses, lines, fibers, links, etc.) to non-transitory computer readable medium 1620 and memory 1604. The location server 1600 may further include a clock 1616 that may be synchronized in time with the TSN clock. In certain example implementations, all or part of location server 1600 may take the form of a chipset, and/or the like.

The one or more processors 1602 may be implemented using a combination of hardware, firmware, and software. For example, the one or more processors 1602 may be configured to perform the functions discussed herein by implementing one or more instructions or program code 1608 on a non-transitory computer readable medium, such as medium 1620 and/or memory 1604. In some embodiments, the one or more processors 1602 may represent one or more circuits configurable to perform at least a portion of a data signal computing procedure or process related to the operation of location server 1600.

The medium 1620 and/or memory 1604 may store instructions or program code 1608 that contain executable code or software instructions that when executed by the one or more processors 1602 cause the one or more processors 1602 to operate as a special purpose computer programmed to perform the techniques disclosed herein. As illustrated in location server 1600, the medium 1620 and/or memory 1604 may include one or more components or modules that may be implemented by the one or more processors 1602 to perform the methodologies described herein. While the components or modules are illustrated as software in medium 1620 that is executable by the one or more processors 1602, it should be understood that the components or modules may be stored in memory 1604 or may be dedicated hardware either in the one or more processors 1602 or off the processors.

A number of software modules and data tables may reside in the medium 1620 and/or memory 1604 and be utilized by the one or more processors 1602 in order to manage both communications and the functionality described herein. It should be appreciated that the organization of the contents of the medium 1620 and/or memory 1604 as shown in location server 1600 is merely exemplary, and as such the functionality of the modules and/or data structures may be combined, separated, and/or be structured in different ways depending upon the implementation of the location server 1600.

The medium 1620 and/or memory 1604 may include a location request receive module 1622 that when implemented by the one or more processors 1602 configures the one or more processors 1602 to receive from another entity, such as a controller, e.g., via communications interface 1618, a location request message requesting locations for the UE at a time point within a time sensitive networking (TSN) framework. The location request message may include additional time points, for example, for a location report to be provided to the location server and for a position estimate to be returned to the entity. The time point may be a global sampling point. The global sampling point may include a period and a phase within the period at which the positioning measurements are to be performed. For example, the period may be the TSN cycle and the phase may be a time instance within the period or TSN cycle.

The medium 1620 and/or memory 1604 may include a location request transmit module 1624 that when implemented by the one or more processors 1602 configures the one or more processors 1602 to transmit to the UE and/or base stations, e.g., via communications interface 1618, a location request message requesting positioning measurements for the UE performed at the time point. The transmitted location request message may include additional time points, for example, for a location report to be provided to the location server. The time point may be a global sampling point. The global sampling point may include a period and a phase within the period at which the positioning measurements are to be performed. For example, the period may be the TSN cycle and the phase may be a time instance within the period or TSN cycle.

The medium 1620 and/or memory 1604 may include a time point module 1626 that when implemented by the one or more processors 1602 configures the one or more processors 1602 to monitor clock 1616 to perform specific actions, such as reporting a position estimate at requested time points in the TSN framework.

The medium 1620 and/or memory 1604 may include a location information receive module 1628 that when implemented by the one or more processors 1602 configures the one or more processors 1602 to receive, via the communications interface 1618, a location report with location information from the UE and/or one or more base stations. The location information, for example, may include positioning measurements performed by the UE and/or one or more base stations at the requested time point, a position estimate determined by the UE, and time stamps associated with the time the positioning measurements were performed.

The medium 1620 and/or memory 1604 may include a position estimate module 1630 that when implemented by the one or more processors 1602 configures the one or more processors 1602 to determine a position estimate for the UE, e.g., by generating a position estimate for the UE using the position measurements performed by the UE and/or the base stations along with the locations of the base stations, or using a position estimate provided by the UE.

The medium 1620 and/or memory 1604 may include a time stamp module 1632 that when implemented by the one or more processors 1602 configures the one or more processors 1602 to associate a time stamp for the positioning measurements with the position estimate.

The medium 1620 and/or memory 1604 may include a report module 1634 that when implemented by the one or more processors 1602 configures the one or more processors 1602 to transmit the position estimate to the requesting entity, via the communications interface 1618, which may include a time stamp.

The methodologies described herein may be implemented by various means depending upon the application. For example, these methodologies may be implemented in hardware, firmware, software, or any combination thereof. For a hardware implementation, the one or more processors 1602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1620 or memory 1604 that is connected to and executed by the one or more processors 1602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1608 on a non-transitory computer readable medium, such as medium 1620 and/or memory 1604. Examples include computer readable media encoded with a data structure and computer readable media encoded with a computer program 1608. For example, the non-transitory computer readable medium including program code 1608 stored thereon may include program code 1608 to support positioning of a UE in a TSN framework in a manner consistent with disclosed embodiments. Non-transitory computer readable medium 1620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1608 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1620, instructions and/or data may be provided as signals on transmission media included in a communication apparatus. For example, a communication apparatus may include a communications interface 1618 having signals indicative of instructions and data. The instructions and data are configured to cause one or more processors to implement the functions outlined in the claims. That is, the communication apparatus includes transmission media with signals indicative of information to perform disclosed functions.

Memory 1604 may represent any data storage mechanism. Memory 1604 may include, for example, a primary memory and/or a secondary memory. Primary memory may include, for example, a random access memory, read only memory, etc. While illustrated in this example as being separate from one or more processors 1602, it should be understood that all or part of a primary memory may be provided within or otherwise co-located/coupled with the one or more processors 1602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1620. As such, in certain example implementations, the methods and/or apparatuses presented herein may take the form in whole or part of a computer readable medium 1620 that may include computer implementable code 1608 stored thereon, which if executed by one or more processors 1602 may be operatively enabled to perform all or portions of the example operations as described herein. Computer readable medium 1620 may be a part of memory 1604.

A location server in a wireless network, such as location server 1600, may be configured to perform positioning of a user equipment (UE) within the wireless network and may include a means for receiving a first location request message from a first entity requesting locations for the UE at a first time point within a time sensitive networking (TSN) framework, which may be, e.g., the communications interface 1618 and one or more processors 1602 with dedicated hardware or implementing executable code or software instructions in memory 1604 and/or medium 1620 such as the location request receive module 1622. A means for transmitting to one or more entities in the wireless network a second location request message requesting positioning measurements for the UE to be performed at the first time point received in the first location request message may be, e.g., the communications interface 1618 and one or more processors 1602 with dedicated hardware or implementing executable code or software instructions in memory 1604 and/or medium 1620 such as the location request transmit module 1624. A means for receiving a location information report from the one or more entities based on positioning measurements for the UE performed at the first time point may be, e.g., the communications interface 1618 and one or more processors 1602 with dedicated hardware or implementing executable code or software instructions in memory 1604 and/or medium 1620 such as the location information receive module 1628. A means for determining a position estimate for the UE based on the location information report may be, e.g., the one or more processors 1602 with dedicated hardware or implementing executable code or software instructions in memory 1604 and/or medium 1620 such as the position estimate module 1630. A means for transmitting the position estimate for the UE to the first entity may be, e.g., the communications interface 1618 and one or more processors 1602 with dedicated hardware or implementing executable code or software instructions in memory 1604 and/or medium 1620 such as the report module 1634.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method performed by an entity in a wireless network of positioning of a user equipment (UE) within the wireless network, comprising:
receiving a location request message that includes a first time point within a time sensitive networking (TSN) framework for performing positioning measurements for the UE;
receiving positioning reference signals (PRS) from one or more other entities in the wireless network;
performing the positioning measurements using the PRS from the one or more other entities at the first time point within the TSN framework specified in the location request message for performing the positioning measurements; and
transmitting to a location server a location information report related to the positioning measurements.

Clause 2. The method of clause 1, wherein the location request message further includes a second time point for providing the location information report, wherein the location information report is transmitted to the location server at or before the second time point.

Clause 3. The method of either of clauses 1 or 2, wherein the entity in the wireless network comprises the UE and the PRS are downlink PRS.

Clause 4. The method of any of clauses 1-3, wherein the entity in the wireless network is a base station and the PRS are uplink PRS.

Clause 5. The method of any of clauses 1-4, wherein the wireless network and the TSN framework are synchronized in time.

Clause 6. The method of any of clauses 1-5, wherein the first time point within the TSN framework specified in the location request message for performing the positioning measurements comprises a global sampling point.

Clause 7. The method of clause 6, wherein the global sampling point comprises a period and a phase.

Clause 8. The method of clause 7, wherein the period is a TSN cycle and the phase is a time instant within the period.

Clause 9. The method of any of clauses 1-8, wherein the entity is the UE and the one or more other entities comprise one or more base stations, the method further comprising:

determining a position estimate for the UE based on the positioning measurements;

wherein the location information report related to the positioning measurements comprises the position estimate for the UE.

Clause 10. The method of clause 9, further comprising receiving positioning measurements from the one or more other entities, and wherein determining the position estimate for the UE is further based on the positioning measurements received from the one or more other entities.

Clause 11. The method of any of clauses 1-10, wherein the location information report related to the positioning measurements comprises the positioning measurements.

Clause 12. The method of any of clauses 1-11, further comprising:

receiving a request to transmit PRS that includes the first time point within the TSN framework for transmitting the PRS; and transmitting PRS to the one or more other entities at the first time point within the TSN framework specified in the location request message for transmitting UL PRS.

Clause 13. The method of any of clauses 1-12, wherein the location information report related to the positioning measurements comprises a time stamp for the positioning measurements.

Clause 14. The method of any of clauses 1-13, wherein the location request message is for periodic positioning of the UE.

Clause 15. The method of any of clauses 1-14, wherein the UE is a sensor in a motion control system using the TSN framework.

Clause 16. An entity in a wireless network configured to perform positioning of a user equipment (UE) within the wireless network, comprising:

an external interface configured to wirelessly communicate with a network entity in the wireless network;

at least one memory;

at least one processor coupled to the external interface and the at least one memory, wherein the at least one processor is configured to:

receive, via the external interface, a location request message that includes a first time point within a time sensitive networking (TSN) framework for performing positioning measurements for the UE;

receive, via the external interface, positioning reference signals (PRS) from one or more other entities in the wireless network;

perform positioning measurements using the PRS from the one or more other entities at the first time point within the TSN framework specified in the location request message for performing the positioning measurements; and transmit, via the external interface, to a location server a location information report related to the positioning measurements.

Clause 17. The entity of clause 16, wherein the location request message further includes a second time point for providing the location information report, wherein the location information report is transmitted to the location server at or before the second time point.

Clause 18. The entity of either of clauses 16 or 17, wherein the entity in the wireless network comprises the UE and the PRS are downlink PRS.

Clause 19. The entity of any of clauses 16-18, wherein the entity in the wireless network is a base station and the PRS are uplink PRS.

Clause 20. The entity of any of clauses 16-19, wherein the wireless network and the TSN framework are synchronized in time.

Clause 21. The entity of any of clauses 16-20, wherein the first time point within the TSN framework specified in the location request message for performing the positioning measurements comprises a global sampling point.

Clause 22. The entity of clause 21, wherein the global sampling point comprises a period and a phase.

Clause 23. The entity of clause 22, wherein the period is a TSN cycle and the phase is a time instant within the period.

Clause 24. The entity of any of clauses 16-23, wherein the entity is the UE and the one or more other entities comprise one or more base stations, wherein the at least one processor is further configured to:

determine a position estimate for the UE based on the positioning measurements;

wherein the location information report related to the positioning measurements comprises the position estimate for the UE.

Clause 25. The entity of clause 24, wherein the at least one processor is further configured to receive positioning measurements from the one or more other entities, and wherein the at least one processor is configured to determine the position estimate for the UE further based on the positioning measurements received from the one or more other entities.

Clause 26. The entity of any of clauses 16-25, wherein the location information report related to the positioning measurements comprises the positioning measurements.

Clause 27. The entity of any of clauses 16-26, wherein the at least one processor is further configured to:

receive, via the external interface, a request to transmit PRS that includes the first time point within the TSN framework for transmitting the PRS; and transmit, via the external interface, PRS to the one or more other entities at the first time point within the TSN framework specified in the location request message for transmitting UL PRS.

Clause 28. The entity of any of clauses 16-27, wherein the location information report related to the positioning measurements comprises a time stamp for the positioning measurements.

Clause 29. The entity of any of clauses 16-28, wherein the location request message is for periodic positioning of the UE.

Clause 30. The entity of any of clauses 16-29, wherein the UE is a sensor in a motion control system using the TSN framework.

Clause 31. An entity in a wireless network configured to perform positioning of a user equipment (UE) within the wireless network, comprising:

means for receiving a location request message that includes a first time point within a time sensitive networking (TSN) framework for performing positioning measurements for the UE;

means for receiving positioning reference signals (PRS) from one or more other entities in the wireless network;

means for performing the positioning measurements using the PRS from the one or more other entities at the first time point within the TSN framework specified in the location request message for performing the positioning measurements; and means for transmitting to a location server a location information report related to the positioning measurements.

Clause 32. The entity of clause 31, wherein the location request message further includes a second time point for providing the location information report, wherein the location information report is transmitted to the location server at or before the second time point.

Clause 33. The entity of either of clauses 31 or 32, wherein the entity in the wireless network comprises the UE and the PRS are downlink PRS.

Clause 34. The entity of any of clauses 31-33, wherein the entity in the wireless network is a base station and the PRS are uplink PRS.

Clause 35. The entity of any of clauses 31-34, wherein the wireless network and the TSN framework are synchronized in time.

Clause 36. The entity of any of clauses 31-35, wherein the first time point within the TSN framework specified in the location request message for performing the positioning measurements comprises a global sampling point.

Clause 37. The entity of clause 36, wherein the global sampling point comprises a period and a phase.

Clause 38. The entity of clause 37, wherein the period is a TSN cycle and the phase is a time instant within the period.

Clause 39. The entity of any of clauses 31-38, wherein the entity is the UE and the one or more other entities comprise one or more base stations, the entity further comprising:

means for determining a position estimate for the UE based on the positioning measurements;

wherein the location information report related to the positioning measurements comprises the position estimate for the UE.

Clause 40. The entity of clause 39, further comprising means for receiving positioning measurements from the one or more other entities, and wherein the means for determining the position estimate for the UE further uses the positioning measurements received from the one or more other entities.

Clause 41. The entity of any of clauses 31-40, wherein the location information report related to the positioning measurements comprises the positioning measurements.

Clause 42. The entity of any of clauses 31-41, further comprising:

means for receiving a request to transmit PRS that includes the first time point within the TSN framework for transmitting the PRS; and means for transmitting PRS to the one or more other entities at the first time point within the TSN framework specified in the location request message for transmitting UL PRS.

Clause 43. The entity of any of clauses 31-42, wherein the location information report related to the positioning measurements comprises a time stamp for the positioning measurements.

Clause 44. The entity of any of clauses 31-43, wherein the location request message is for periodic positioning of the UE.

Clause 45. The entity of any of clauses 31-44, wherein the UE is a sensor in a motion control system using the TSN framework.

Clause 46. A non-transitory storage medium including program code stored thereon, the program code is operable to configure at least one processor in an entity in a wireless network to perform positioning of a user equipment (UE) within the wireless network, the program code including instructions to:

receive a location request message that includes a first time point within a time sensitive networking (TSN) framework for performing positioning measurements for the UE;

receive positioning reference signals (PRS) from one or more other entities in the wireless network;

perform the positioning measurements using the PRS from the one or more other entities at the first time point within the TSN framework specified in the location request message for performing the positioning measurements; and transmit to a location server a location information report related to the positioning measurements.

Clause 47. The non-transitory storage medium of clause 46, wherein the location request message further includes a second time point for providing the location information report, wherein the location information report is transmitted to the location server at or before the second time point.

Clause 48. The non-transitory storage medium of either of clauses 46 or 47, wherein the entity in the wireless network comprises the UE and the PRS are downlink PRS.

Clause 49. The non-transitory storage medium of any of clauses 46-48, wherein the entity in the wireless network is a base station and the PRS are uplink PRS.

Clause 50. The non-transitory storage medium of any of clauses 46-49, wherein the wireless network and the TSN framework are synchronized in time.

Clause 51. The non-transitory storage medium of any of clauses 46-50, wherein the first time point within the TSN framework specified in the location request message for performing the positioning measurements comprises a global sampling point.

Clause 52. The non-transitory storage medium of clause 51, wherein the global sampling point comprises a period and a phase.

Clause 53. The non-transitory storage medium of clause 52, wherein the period is a TSN cycle and the phase is a time instant within the period.

Clause 54. The non-transitory storage medium of any of clauses 46-53, wherein the entity is the UE and the one or more other entities comprise one or more base stations, the program code further including instructions to:

determine a position estimate for the UE based on the positioning measurements;

wherein the location information report related to the positioning measurements comprises the position estimate for the UE.

Clause 55. The non-transitory storage medium of clause 54, the program code further including instructions to receive positioning measurements from the one or more other entities, and wherein the instructions to determine the position estimate for the UE further uses the positioning measurements received from the one or more other entities.

Clause 56. The non-transitory storage medium of any of clauses 46-55, wherein the location information report related to the positioning measurements comprises the positioning measurements.

Clause 57. The non-transitory storage medium of any of clauses 46-56, the program code further including instructions to:

receive a request to transmit PRS that includes the first time point within the TSN framework for transmitting the PRS; and transmit PRS to the one or more other entities at the first time point within the TSN framework specified in the location request message for transmitting UL PRS.

Clause 58. The non-transitory storage medium of any of clauses 46-57, wherein the location information report related to the positioning measurements comprises a time stamp for the positioning measurements.

Clause 59. The non-transitory storage medium of any of clauses 46-58, wherein the location request message is for periodic positioning of the UE.

Clause 60. The non-transitory storage medium of any of clauses 46-59, wherein the UE is a sensor in a motion control system using the TSN framework.

Clause 61. A method performed by an entity in a wireless network of positioning of a user equipment (UE) within the wireless network, comprising:

receiving a positioning reference signals (PRS) transmission request message that includes a first time point within a time sensitive networking (TSN) framework for transmitting PRS; and transmitting the PRS at the first time point within the TSN framework specified in the PRS transmission request message for transmitting the PRS.

Clause 62. The method of clause 61, wherein the entity in the wireless network comprises the UE and the PRS are uplink PRS.

Clause 63. The method of either of clauses 61 or 62, wherein the entity in the wireless network is a base station and the PRS are downlink PRS.

Clause 64. The method of any of clauses 61-63, wherein the wireless network and the TSN framework are synchronized in time.

Clause 65. The method of any of clauses 61-64, wherein the first time point within the TSN framework specified in the PRS transmission request message for transmitting the PRS comprises a global sampling point.

Clause 66. The method of clause 65, wherein the global sampling point comprises a period and a phase.

Clause 67. The method of clause 66, wherein the period is a TSN cycle and the phase is a time instant within the period.

Clause 68. The method of any of clauses 61-67, wherein the PRS transmission request message is for periodic PRS transmissions.

Clause 69. The method of any of clauses 61-68, wherein the UE is a sensor in a motion control system.

Clause 70. An entity in a wireless network configured to perform positioning of a user equipment (UE) within the wireless network, comprising:

an external interface configured to wirelessly communicate with a network entity in the wireless network;
at least one memory;
at least one processor coupled to the external interface and the at least one memory, wherein the at least one processor is configured to:

receive, via the external interface, a positioning reference signals (PRS) transmission request message that includes a first time point within a time sensitive networking (TSN) framework for transmitting PRS; and transmit, via the external interface, the PRS at the first time point within the TSN framework specified in the PRS transmission request message for transmitting the PRS.

Clause 71. The entity of clause 70, wherein the entity in the wireless network comprises the UE and the PRS are uplink PRS.

Clause 72. The entity of either of clauses 70 or 71, wherein the entity in the wireless network is a base station and the PRS are downlink PRS.

Clause 73. The entity of any of clauses 70-72, wherein the wireless network and the TSN framework are synchronized in time.

Clause 74. The entity of any of clauses 70-73, wherein the first time point within the TSN framework specified in the PRS transmission request message for transmitting the PRS comprises a global sampling point.

Clause 75. The entity of clause 74, wherein the global sampling point comprises a period and a phase.

Clause 76. The entity of clause 75, wherein the period is a TSN cycle and the phase is a time instant within the period.

Clause 77. The entity of any of clauses 70-76, wherein the PRS transmission request message is for periodic PRS transmissions.

Clause 78. The entity of any of clauses 70-77, wherein the UE is a sensor in a motion control system.

Clause 79. An entity in a wireless network configured to perform positioning of a user equipment (UE) within the wireless network, comprising:

means for receiving a positioning reference signals (PRS) transmission request message that includes a first time point within a time sensitive networking (TSN) framework for transmitting PRS; and means for transmitting the PRS at the first time point within the TSN framework specified in the PRS transmission request message for transmitting the PRS.

Clause 80. The entity of clause 79, wherein the entity in the wireless network comprises the UE and the PRS are uplink PRS.

Clause 81. The entity of either of clauses 79 or 80, wherein the entity in the wireless network is a base station and the PRS are downlink PRS.

Clause 82. The entity of any of clauses 79-81, wherein the wireless network and the TSN framework are synchronized in time.

Clause 83. The entity of any of clauses 79-82, wherein the first time point within the TSN framework specified in the PRS transmission request message for transmitting the PRS comprises a global sampling point.

Clause 84. The entity of clause 83, wherein the global sampling point comprises a period and a phase.

Clause 85. The entity of clause 84, wherein the period is a TSN cycle and the phase is a time instant within the period.

Clause 86. The entity of any of clauses 79-85, wherein the PRS transmission request message is for periodic PRS transmissions.

Clause 87. The entity of any of clauses 79-86, wherein the UE is a sensor in a motion control system.

Clause 88. A non-transitory storage medium including program code stored thereon, the program code is operable to configure at least one processor in an entity in a wireless network to perform positioning of a user equipment (UE) within the wireless network, the program code including instructions to:

receive a positioning reference signals (PRS) transmission request message that includes a first time point within a time sensitive networking (TSN) framework for transmitting PRS; and transmit the PRS at the first time point within the TSN framework specified in the PRS transmission request message for transmitting the PRS.

Clause 89. The non-transitory storage medium of clause 88, wherein the entity in the wireless network comprises the UE and the PRS are uplink PRS.

Clause 90. The non-transitory storage medium of either of clauses 88 or 89, wherein the entity in the wireless network is a base station and the PRS are downlink PRS.

Clause 91. The non-transitory storage medium of any of clauses 88-90, wherein the wireless network and the TSN framework are synchronized in time.

Clause 92. The non-transitory storage medium of any of clauses 88-91, wherein the first time point within the TSN framework specified in the PRS transmission request message for transmitting the PRS comprises a global sampling point.

Clause 93. The non-transitory storage medium of clause 92, wherein the global sampling point comprises a period and a phase.

Clause 94. The non-transitory storage medium of clause 93, wherein the period is a TSN cycle and the phase is a time instant within the period.

Clause 95. The non-transitory storage medium of any of clauses 88-94, wherein the PRS transmission request message is for periodic PRS transmissions.

Clause 96. The non-transitory storage medium of any of clauses 88-95, wherein the UE is a sensor in a motion control system.

Clause 97. A method performed by a location server in a wireless network of positioning of a user equipment (UE) within the wireless network, comprising:
receiving a first location request message from a first entity requesting locations for the UE at a first time point within a time sensitive networking (TSN) framework;
transmitting to one or more entities in the wireless network a second location request message requesting positioning measurements for the UE to be performed at the first time point received in the first location request message;
receiving a location information report from the one or more entities based on positioning measurements for the UE performed at the first time point;
determining a position estimate for the UE based on the location information report; and
transmitting the position estimate for the UE to the first entity.

Clause 98. The method of clause 97, wherein the first location request message further includes a second time point for providing the position estimate, wherein the position estimate is transmitted to the first entity at or before the second time point.

Clause 99. The method of either of clauses 97 or 98, wherein the wireless network and the TSN framework are synchronized in time.

Clause 100. The method of any of clauses 97-99, wherein the first time point within the TSN framework comprises a global sampling point.

Clause 101. The method of clause 100, wherein the global sampling point comprises a period and a phase.

Clause 102. The method of clause 101, wherein the period is a TSN cycle and the phase is a time instant within the period.

Clause 103. The method of any of clauses 97-102, wherein the location information report based on the positioning measurements for the UE comprises one of positioning measurements performed by the UE based on downlink (DL) positioning reference signals (PRS) received by the UE, positioning measurements performed by a base station based on uplink (UL) PRS transmitted by the UE, or a combination thereof; and wherein determining the position estimate for the UE comprises generating the position estimate using the positioning measurements for the UE received in the location information report.

Clause 104. The method of any of clauses 97-103, wherein the location information report based on the positioning measurements for the UE comprises the position estimate for the UE that is determined by the UE.

Clause 105. The method of any of clauses 97-104, wherein the location information report based on the positioning measurements for the UE comprises a time stamp for the positioning measurements, and wherein the position estimate for the UE includes the time stamp for the positioning measurements.

Clause 106. The method of any of clauses 97-105, wherein the first location request message and the second location request message are for periodic positioning of the UE.

Clause 107. The method of any of clauses 97-106, wherein the UE and the location server are a sensor and the first entity is a motion controller in a motion control system using the TSN framework.

Clause 108. A location server in a wireless network configured to perform positioning of a user equipment (UE) within the wireless network, comprising:
an external interface configured to wirelessly communicate with a network entity in the wireless network;
at least one memory;
at least one processor coupled to the external interface and the at least one memory, wherein the at least one processor is configured to:
receive, via the external interface, a first location request message from a first entity requesting locations for the UE at a first time point within a time sensitive networking (TSN) framework;
transmit, via the external interface, to one or more entities in the wireless network a second location request message requesting positioning measurements for the UE to be performed at the first time point received in the first location request message;
receive, via the external interface, a location information report from the one or more entities based on positioning measurements for the UE performed at the first time point;
determine a position estimate for the UE based on the location information report; and
transmit, via the external interface, the position estimate for the UE to the first entity.

Clause 109. The location server of clause 108, wherein the first location request message further includes a second time point for providing the position estimate, wherein the position estimate is transmitted to the first entity at or before the second time point.

Clause 110. The location server of either of clauses 108 or 109, wherein the wireless network and the TSN framework are synchronized in time.

Clause 111. The location server of any of clauses 108-110, wherein the first time point within the TSN framework comprises a global sampling point.

Clause 112. The location server of clause 111, wherein the global sampling point comprises a period and a phase.

Clause 113. The location server of clause 112, wherein the period is a TSN cycle and the phase is a time instant within the period.

Clause 114. The location server of any of clauses 108-113, wherein the location information report based on the positioning measurements for the UE comprises one of positioning measurements performed by the UE based on downlink (DL) positioning reference signals (PRS) received by the UE, positioning measurements performed by a base station based on uplink (UL) PRS transmitted by the UE, or a combination thereof; and wherein the at least one processor is configured to determine the position estimate for the UE by being configured to generate the position estimate using the positioning measurements for the UE received in the location information report.

Clause 115. The location server of any of clauses 108-114, wherein the location information report based on the positioning measurements for the UE comprises the position estimate for the UE that is determined by the UE.

Clause 116. The location server of any of clauses 108-115, wherein the location information report based on the positioning measurements for the UE comprises a time stamp for the positioning measurements, and wherein the position estimate for the UE includes the time stamp for the positioning measurements.

Clause 117. The location server of any of clauses 108-116, wherein the first location request message and the second location request message are for periodic positioning of the UE.

Clause 118. The location server of any of clauses 108-117, wherein the UE and the location server are a sensor and the first entity is a motion controller in a motion control system using the TSN framework.

Clause 119. A location server in a wireless network configured to perform positioning of a user equipment (UE) within the wireless network, comprising:
means for receiving a first location request message from a first entity requesting locations for the UE at a first time point within a time sensitive networking (TSN) framework;
means for transmitting to one or more entities in the wireless network a second location request message requesting positioning measurements for the UE to be performed at the first time point received in the first location request message;
means for receiving a location information report from the one or more entities based on positioning measurements for the UE performed at the first time point;
means for determining a position estimate for the UE based on the location information report; and
means for transmitting the position estimate for the UE to the first entity.

Clause 120. The location server of clause 119, wherein the first location request message further includes a second time point for providing the position estimate, wherein the position estimate is transmitted to the first entity at or before the second time point.

Clause 121. The location server of either of clauses 119 or 120, wherein the wireless network and the TSN framework are synchronized in time.

Clause 122. The location server of any of clauses 119-121, wherein the first time point within the TSN framework comprises a global sampling point.

Clause 123. The location server of clause 122, wherein the global sampling point comprises a period and a phase.

Clause 124. The location server of clause 123, wherein the period is a TSN cycle and the phase is a time instant within the period.

Clause 125. The location server of any of clauses 119-124, wherein the location information report based on the positioning measurements for the UE comprises one of positioning measurements performed by the UE based on downlink (DL) positioning reference signals (PRS) received by the UE, positioning measurements performed by a base station based on uplink (UL) PRS transmitted by the UE, or a combination thereof; and wherein the means for determining the position estimate for the UE comprises means for generating the position estimate using the positioning measurements for the UE received in the location information report.

Clause 126. The location server of any of clauses 119-125, wherein the location information report based on the positioning measurements for the UE comprises the position estimate for the UE that is determined by the UE.

Clause 127. The location server of any of clauses 119-126, wherein the location information report based on the positioning measurements for the UE comprises a time stamp for the positioning measurements, and wherein the position estimate for the UE includes the time stamp for the positioning measurements.

Clause 128. The location server of any of clauses 119-127, wherein the first location request message and the second location request message are for periodic positioning of the UE.

Clause 129. The location server of any of clauses 119-128, wherein the UE and the location server are a sensor and the first entity is a motion controller in a motion control system using the TSN framework.

Clause 130. A non-transitory storage medium including program code stored thereon, the program code is operable to configure at least one processor in a location server in a wireless network to perform positioning of a user equipment (UE) within the wireless network, the program code including instructions to:
receive a first location request message from a first entity requesting locations for the UE at a first time point within a time sensitive networking (TSN) framework;
transmit to one or more entities in the wireless network a second location request message requesting positioning measurements for the UE to be performed at the first time point received in the first location request message;
receive a location information report from the one or more entities based on positioning measurements for the UE performed at the first time point;
determine a position estimate for the UE based on the location information report; and
transmit the position estimate for the UE to the first entity.

Clause 131. The non-transitory storage medium of clause 130, wherein the first location request message further includes a second time point for providing the position estimate, wherein the position estimate is transmitted to the first entity at or before the second time point.

Clause 132. The non-transitory storage medium of either of clauses 130 or 131, wherein the wireless network and the TSN framework are synchronized in time.

Clause 133. The non-transitory storage medium of any of clauses 130-132, wherein the first time point within the TSN framework comprises a global sampling point.

Clause 134. The non-transitory storage medium of clause 133, wherein the global sampling point comprises a period and a phase.

Clause 135. The non-transitory storage medium of clause 134, wherein the period is a TSN cycle and the phase is a time instant within the period.

Clause 136. The non-transitory storage medium of any of clauses 130-125, wherein the location information report based on the positioning measurements for the UE comprises one of positioning measurements performed by the UE based on downlink (DL) positioning reference signals (PRS) received by the UE, positioning measurements performed by a base station based on uplink (UL) PRS transmitted by the UE, or a combination thereof; and wherein the program code including instructions to determine the position estimate for the UE comprises instructions to generate the position estimate using the positioning measurements for the UE received in the location information report.

Clause 137. The non-transitory storage medium of any of clauses 130-136, wherein the location information report based on the positioning measurements for the UE comprises the position estimate for the UE that is determined by the UE.

Clause 138. The non-transitory storage medium of any of clauses 130-137, wherein the location information report based on the positioning measurements for the UE comprises a time stamp for the positioning measurements, and wherein the position estimate for the UE includes the time stamp for the positioning measurements.

Clause 139. The non-transitory storage medium of any of clauses 130-138, wherein the first location request message and the second location request message are for periodic positioning of the UE.

Clause 140. The non-transitory storage medium of any of clauses 130-139, wherein the UE and the location server are a sensor and the first entity is a motion controller in a motion control system using the TSN framework.

Therefore, it is intended that claimed subject matter not be limited to the particular examples disclosed, but that such claimed subject matter may also include all aspects falling within the scope of appended claims, and equivalents thereof.

What is claimed is:

1. A method performed by an entity in a wireless network of positioning of a user equipment (UE) within the wireless network, comprising:
    receiving a location request message that includes a first time point within a time sensitive networking (TSN) framework for performing positioning measurements for the UE, wherein the first time point within the TSN framework specified in the location request message for performing the positioning measurements comprises a global sampling point;
    receiving positioning reference signals (PRS) from one or more other entities in the wireless network;
    performing the positioning measurements using the PRS from the one or more other entities at the first time point within the TSN framework specified in the location request message for performing the positioning measurements; and
    transmitting to a location server a location information report related to the positioning measurements.

2. The method of claim 1, wherein the location request message further includes a second time point for providing the location information report, wherein the location information report is transmitted to the location server at or before the second time point.

3. The method of claim 1, wherein the entity in the wireless network comprises the UE and the PRS are downlink PRS.

4. The method of claim 1, wherein the entity in the wireless network is a base station and the PRS are uplink PRS.

5. The method of claim 1, wherein the wireless network and the TSN framework are synchronized in time.

6. The method of claim 1, wherein the global sampling point comprises a period and a phase.

7. The method of claim 6, wherein the period is a TSN cycle and the phase is a time instant within the period.

8. The method of claim 1, wherein the entity is the UE and the one or more other entities comprise one or more base stations, the method further comprising:
    determining a position estimate for the UE based on the positioning measurements;
    wherein the location information report related to the positioning measurements comprises the position estimate for the UE.

9. The method of claim 8, further comprising receiving positioning measurements from the one or more other entities, and wherein determining the position estimate for the UE is further based on the positioning measurements received from the one or more other entities.

10. The method of claim 1, wherein the location information report related to the positioning measurements comprises the positioning measurements.

11. The method of claim 1, further comprising:
    receiving a request to transmit PRS that includes the first time point within the TSN framework for transmitting the PRS; and
    transmitting PRS to the one or more other entities at the first time point within the TSN framework specified in the location request message for transmitting UL PRS.

12. The method of claim 1, wherein the location information report related to the positioning measurements comprises a time stamp for the positioning measurements.

13. The method of claim 1, wherein the location request message is for periodic positioning of the UE.

14. The method of claim 1, wherein the UE is a sensor in a motion control system using the TSN framework.

15. An entity in a wireless network configured to perform positioning of a user equipment (UE) within the wireless network, comprising:
    an external interface configured to wirelessly communicate with one or more network entities in the wireless network;
    at least one memory;
    at least one processor coupled to the external interface and the at least one memory, wherein the at least one processor is configured to:
    receive, via the external interface, a location request message that includes a first time point within a time sensitive networking (TSN) framework for performing positioning measurements for the UE, wherein the first time point within the TSN framework specified in the location request message for performing the positioning measurements comprises a global sampling point;
    receive, via the external interface, positioning reference signals (PRS) from one or more other entities in the wireless network;
    perform the positioning measurements using the PRS from the one or more other entities at the first time point within the TSN framework specified in the location request message for performing the positioning measurements; and
    transmit, via the external interface, to a location server a location information report related to the positioning measurements.

16. The entity of claim 15, wherein the location request message further includes a second time point for providing the location information report, wherein the location information report is transmitted to the location server at or before the second time point.

17. The entity of claim 15, wherein the entity in the wireless network comprises the UE and the PRS are downlink PRS.

18. The entity of claim 15, wherein the entity in the wireless network is a base station and the PRS are uplink PRS.

19. The entity of claim 15, wherein the wireless network and the TSN framework are synchronized in time.

20. The entity of claim 15, wherein the global sampling point comprises a period and a phase.

21. The entity of claim 20, wherein the period is a TSN cycle and the phase is a time instant within the period.

22. The entity of claim 15, wherein the entity is the UE and the one or more other entities comprise one or more base stations, wherein the at least one processor is further configured to:
  determine a position estimate for the UE based on the positioning measurements;
  wherein the location information report related to the positioning measurements comprises the position estimate for the UE.

23. The entity of claim 22, wherein the at least one processor is further configured to receive positioning measurements from the one or more other entities, and wherein the at least one processor is configured to determine the position estimate for the UE further based on the positioning measurements received from the one or more other entities.

24. The entity of claim 15, wherein the location information report related to the positioning measurements comprises the positioning measurements.

25. The entity of claim 15, wherein the at least one processor is further configured to:
  receive, via the external interface, a request to transmit PRS that includes the first time point within the TSN framework for transmitting the PRS; and
  transmit, via the external interface, PRS to the one or more other entities at the first time point within the TSN framework specified in the location request message for transmitting UL PRS.

26. The entity of claim 15, wherein the location information report related to the positioning measurements comprises a time stamp for the positioning measurements.

27. The entity of claim 15, wherein the location request message is for periodic positioning of the UE.

28. The entity of claim 15, wherein the UE is a sensor in a motion control system using the TSN framework.

29. An entity in a wireless network configured to perform positioning of a user equipment (UE) within the wireless network, comprising:
  means for receiving a location request message that includes a first time point within a time sensitive networking (TSN) framework for performing positioning measurements for the UE, wherein the first time point within the TSN framework specified in the location request message for performing the positioning measurements comprises a global sampling point;
  means for receiving positioning reference signals (PRS) from one or more other entities in the wireless network;
  means for performing the positioning measurements using the PRS from the one or more other entities at the first time point within the TSN framework specified in the location request message for performing the positioning measurements; and
  means for transmitting to a location server a location information report related to the positioning measurements.

30. The entity of claim 29, wherein the entity is the UE and the one or more other entities comprise one or more base stations, the entity further comprising:
  means for determining a position estimate for the UE based on the positioning measurements;
  wherein the location information report related to the positioning measurements comprises the position estimate for the UE.

31. The entity of claim 29, further comprising:
  means for receiving a request to transmit PRS that includes the first time point within the TSN framework for transmitting the PRS; and
  means for transmitting PRS to the one or more other entities at the first time point within the TSN framework specified in the location request message for transmitting UL PRS.

32. A method performed by a location server in a wireless network of positioning of a user equipment (UE) within the wireless network, comprising:
  receiving a first location request message from a first entity requesting locations for the UE at a first time point within a time sensitive networking (TSN) framework, wherein the first time point within the TSN framework comprises a global sampling point;
  transmitting to one or more entities in the wireless network a second location request message requesting positioning measurements for the UE to be performed at the first time point received in the first location request message;
  receiving a location information report from the one or more entities based on positioning measurements for the UE performed at the first time point;
  determining a position estimate for the UE based on the location information report; and
  transmitting the position estimate for the UE to the first entity.

33. The method of claim 32, wherein the first location request message further includes a second time point for providing the position estimate, wherein the position estimate is transmitted to the first entity at or before the second time point.

34. The method of claim 32, wherein the wireless network and the TSN framework are synchronized in time.

35. The method of claim 32, wherein the global sampling point comprises a period and a phase.

36. The method of claim 35, wherein the period is a TSN cycle and the phase is a time instant within the period.

37. The method of claim 32, wherein the location information report based on the positioning measurements for the UE comprises one of positioning measurements performed by the UE based on downlink (DL) positioning reference signals (PRS) received by the UE, positioning measurements performed by a base station based on uplink (UL) PRS transmitted by the UE, or a combination thereof; and wherein determining the position estimate for the UE comprises generating the position estimate using the positioning measurements for the UE received in the location information report.

38. The method of claim 32, wherein the location information report based on the positioning measurements for the UE comprises the position estimate for the UE that is determined by the UE.

39. The method of claim 32, wherein the location information report based on the positioning measurements for the UE comprises a time stamp for the positioning measurements, and wherein the position estimate for the UE includes the time stamp for the positioning measurements.

40. The method of claim 32, wherein the first location request message and the second location request message are for periodic positioning of the UE.

41. The method of claim 32, wherein the UE and the location server are a sensor and the first entity is a motion controller in a motion control system using the TSN framework.

42. A location server in a wireless network configured to perform positioning of a user equipment (UE) within the wireless network, comprising:
- an external interface configured to wirelessly communicate with one or more network entities in the wireless network;
- at least one memory;
- at least one processor coupled to the external interface and the at least one memory, wherein the at least one processor is configured to:
  - receive, via the external interface, a first location request message from a first entity requesting locations for the UE at a first time point within a time sensitive networking (TSN) framework, wherein the first time point within the TSN framework comprises a global sampling point;
  - transmit, via the external interface, to one or more entities in the wireless network a second location request message requesting positioning measurements for the UE to be performed at the first time point received in the first location request message;
  - receive, via the external interface, a location information report from the one or more entities based on positioning measurements for the UE performed at the first time point;
  - determine a position estimate for the UE based on the location information report; and
  - transmit, via the external interface, the position estimate for the UE to the first entity.

43. The location server of claim 42, wherein the first location request message further includes a second time point for providing the position estimate, wherein the position estimate is transmitted to the first entity at or before the second time point.

44. The location server of claim 42, wherein the wireless network and the TSN framework are synchronized in time.

45. The location server of claim 42, wherein the global sampling point comprises a period and a phase.

46. The location server of claim 45, wherein the period is a TSN cycle and the phase is a time instant within the period.

47. The location server of claim 42, wherein the location information report based on the positioning measurements for the UE comprises one of positioning measurements performed by the UE based on downlink (DL) positioning reference signals (PRS) received by the UE, positioning measurements performed by a base station based on uplink (UL) PRS transmitted by the UE, or a combination thereof; and wherein the at least one processor is configured to determine the position estimate for the UE by being configured to generate the position estimate using the positioning measurements for the UE received in the location information report.

48. The location server of claim 42, wherein the location information report based on the positioning measurements for the UE comprises the position estimate for the UE that is determined by the UE.

49. The location server of claim 42, wherein the location information report based on the positioning measurements for the UE comprises a time stamp for the positioning measurements, and wherein the position estimate for the UE includes the time stamp for the positioning measurements.

50. The location server of claim 42, wherein the first location request message and the second location request message are for periodic positioning of the UE.

51. The location server of claim 42, wherein the UE and the location server are a sensor and the first entity is a motion controller in a motion control system using the TSN framework.

52. A location server in a wireless network configured to perform positioning of a user equipment (UE) within the wireless network, comprising:
- means for receiving a first location request message from a first entity requesting locations for the UE at a first time point within a time sensitive networking (TSN) framework, wherein the first time point within the TSN framework comprises a global sampling point;
- means for transmitting to one or more entities in the wireless network a second location request message requesting positioning measurements for the UE to be performed at the first time point received in the first location request message;
- means for receiving a location information report from the one or more entities based on positioning measurements for the UE performed at the first time point;
- means for determining a position estimate for the UE based on the location information report; and
- means for transmitting the position estimate for the UE to the first entity.

53. The location server of claim 52, wherein the location information report based on the positioning measurements for the UE comprises one of positioning measurements performed by the UE based on downlink (DL) positioning reference signals (PRS) received by the UE, positioning measurements performed by a base station based on uplink (UL) PRS transmitted by the UE, or a combination thereof; and wherein the means for determining the position estimate for the UE comprises means for generating the position estimate using the positioning measurements for the UE received in the location information report.

* * * * *